United States Patent [19]

Koyama et al.

[11] 4,414,378

[45] Nov. 8, 1983

[54] GRANULAR OR POWDERY PHENOL-FORMALDEHYDE RESIN AND PROCESS FOR PRODUCTION THEREOF

[75] Inventors: Hiroaki Koyama, Kobe; Shigeo Shimizu, Osaka, both of Japan

[73] Assignee: Mitsubishi Chemical Industries Limited, Tokyo, Japan

[21] Appl. No.: 368,729

[22] Filed: Apr. 15, 1982

[30] Foreign Application Priority Data

Apr. 23, 1981 [JP] Japan ................................. 56-60613

[51] Int. Cl.$^3$ ............................................. C08G 8/10
[52] U.S. Cl. ................................. 528/137; 528/129; 528/146; 528/147; 528/153; 528/155; 528/165; 528/142; 528/156
[58] Field of Search .............. 528/129, 137, 142, 146, 528/147, 153, 155, 165, 156

[56] References Cited

U.S. PATENT DOCUMENTS

| | | | |
|---|---|---|---|
| 1,216,728 | 2/1917 | Pollak | 528/165 |
| 2,120,549 | 6/1938 | Dike | 528/137 X |
| 3,419,527 | 12/1968 | Akutin et al. | 528/137 |
| 3,558,559 | 1/1971 | LeBlanc | 528/162 X |
| 3,687,896 | 8/1972 | Vargiu et al. | 528/137 |
| 4,169,937 | 10/1979 | Vargiu et al. | 528/162 X |
| 4,206,095 | 6/1980 | Wynstra et al. | 528/137 |
| 4,317,901 | 3/1982 | Cosway | 528/165 X |
| 4,319,016 | 3/1982 | Kurobe et al. | 528/162 X |
| 4,336,179 | 6/1982 | Mer | 528/165 X |
| 4,366,303 | 12/1982 | Kopf | 528/129 |

*Primary Examiner*—Howard E. Schain
*Attorney, Agent, or Firm*—Sherman & Shalloway

[57] ABSTRACT

A granular or powdery resin which is a condensation product of a phenol and formaldehyde, said granular or powdery resin being characterized by (A) containing spherical primary particles and secondary particles resulting from the agglomeration of the primary particles, each of the particles having a particle diameter of 0.1 to 150 microns, (B) having such a size that at least 50% by weight thereof can pass through a 100 Tyler mesh sieve, (C) having a free phenol content, determined by liquid chromatography, of not more than 50 ppm, (D) having a $D_{990-1015}/D_{1600}$ ratio of from 0.2 to 9.0 and a $D_{890}/D_{1600}$ ratio of from 0.09 to 1.0 in its infrared absorption spectrum measured by a KBr tablet method, wherein $D_{1600}$ represents the absorption intensity of an absorption peak at 1600 cm$^{-1}$, $D_{990-1015}$ represents the highest absorption intensity of absorption peaks at 990 to 1015 cm$^{-1}$, and the $D_{890}$ represents the absorption intensity of an absorption peak at 890 cm$^{-1}$, and (E) having a weight increase by acetylation of 23 to 40% by weight.

The granular or powdery phenol-formaldehyde resin may be produced by a process which comprises contacting a phenol with a hydrochloric acid-formaldehyde bath containing 5 to 28% by weight of hydrochloric acid and 3 to 25% by weight of formaldehyde with the total concentration of hydrochloric acid and formaldehyde being 15 to 40% by weight, while maintaining a bath ratio, defined by the quotient of the weight of the hydrochloric acid-formaldehyde bath divided by the weight of the phenol, of at least 8, said contacting being effected such that after contacting of the phenol with the bath, white suspended particles are formed and thereafter developed into a pink-colored granular or powdery solid.

56 Claims, 9 Drawing Figures

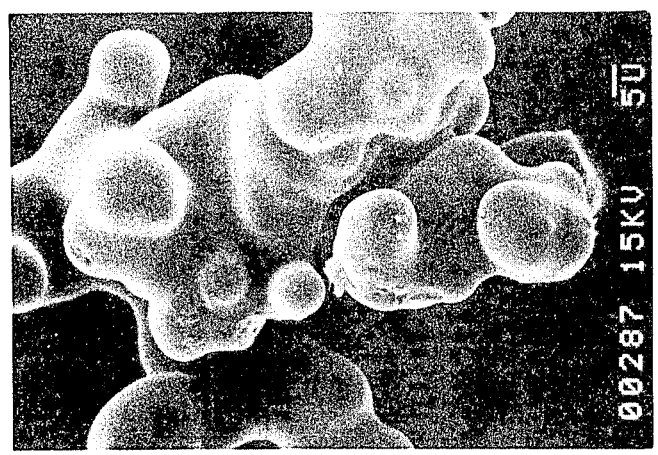
Fig. I-B
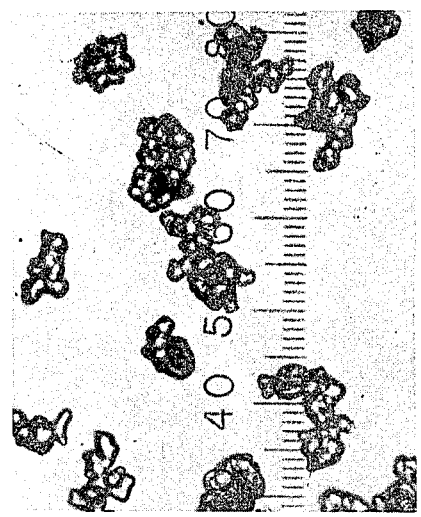
Fig. I-A

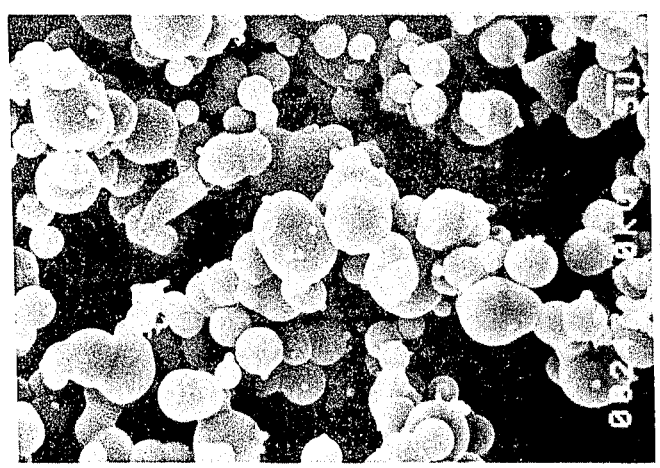
Fig. 2-B
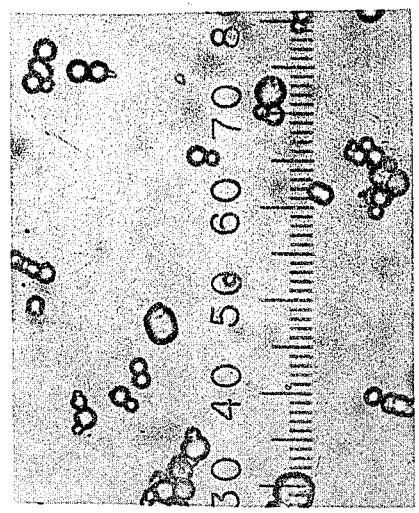
Fig. 2-A

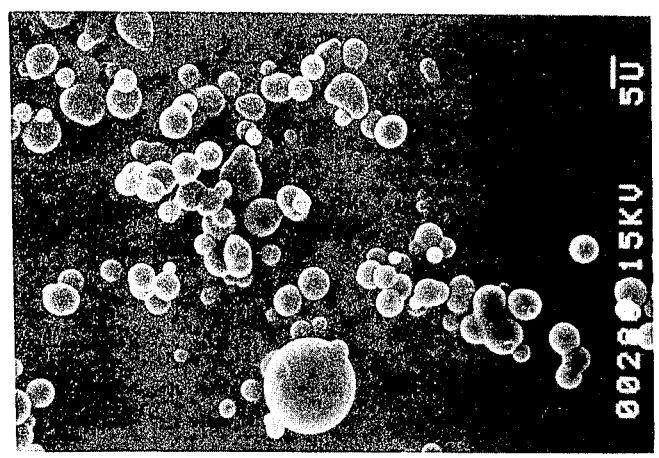
Fig. 3-B
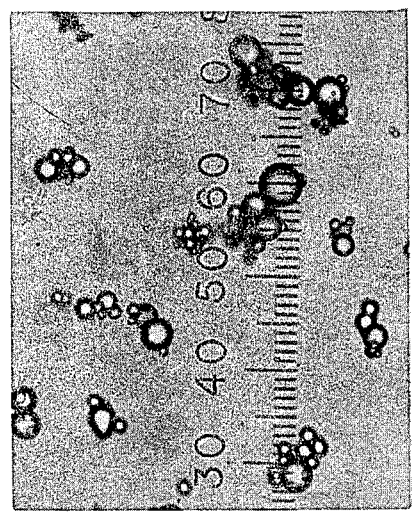
Fig. 3-A

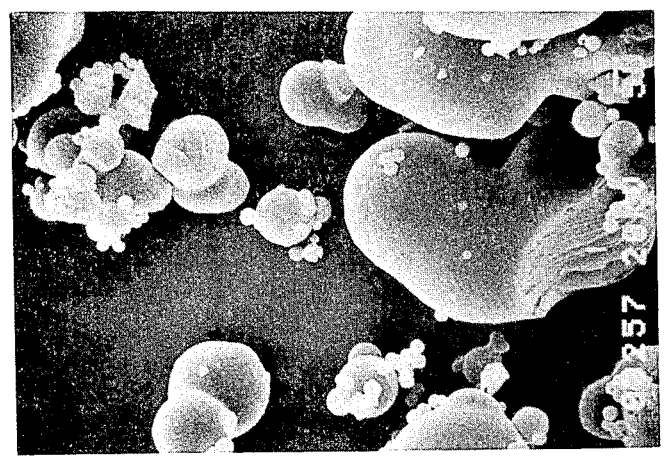
Fig. 4-B
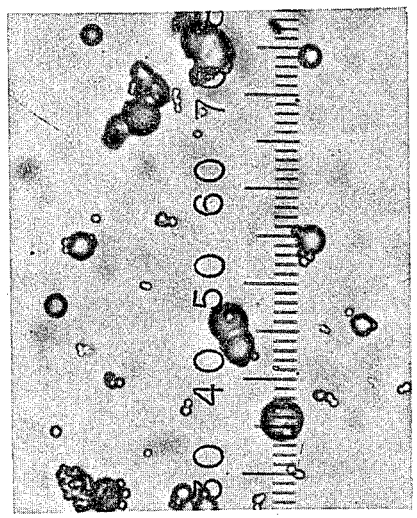
Fig. 4-A

GRANULAR OR POWDERY PHENOL-FORMALDEHYDE RESIN AND PROCESS FOR PRODUCTION THEREOF

BACKGROUND OF THE INVENTION

1. Field of the Invention

This invention relates to a novel granular or powdery phenol-formaldehyde resin and a process for its production. More specifically, it relates to a novel granular or powdery phenol-formaldehyde resin which has reactivity and good storage stability and flow characteristics and is suitable as a molding material, and to a novel process for its production.

2. Description of the Prior Art

Typical known phenol-formaldehyde resins are novolak resins and resol resins.

The novolak resins are usually produced by reacting an excess of phenol with formaldehyde in the presence of an acid catalyst such as oxalic acid (usually in an amount of 0.2 to 2%) while maintaining the mole ratio of phenol to formaldehyde at, for example, 1:0.7–0.9. The novolak resins so produced have no self-crosslinkability and are thermoplastic because they are composed of, as main components, tri-, tetra- and pentamers resulting from the bonding of phenol moieties mainly by methylene groups and contain almost no methylol groups. The novolak resins can be converted to cured resins by, for example, reacting them under heat with a crosslinking agent, such as hexamine (hexamethylenetetramine), which is at once a formaldehyde generator and an organic base (catalyst) generator, or by mixing them with a solid acid catalyst and paraformaldehyde and reacting them under heat. When such a novolak resin in accordance with the former method is used as a molding material, the resulting molded article will be foamed owing to the generation of ammonia by the decomposition of hexamine or the undecomposed part of hexamine, or an organic base formed as a by-product will remain in the molded article. This causes the defect that the properties of the molded article are deteriorated, and the curing reaction is time-consuming. According to the latter curing method, those parts of the novolak resin which make contact with the paraformaldehyde and the acid catalyst undergo excessive crosslinking reaction, and it is difficult to cure the resin uniformly. Furthermore, the acid catalyst or paraformaldehyde remains in the molded article to degrade its properties with the lapse of time, or troubles such as foaming occur owing to the decomposition of the acid catalyst or paraformaldehyde during curing. Another defect is that when the novolak resin is to be mixed with another resin, hexamine, the acid catalyst, paraformaldehyde, etc. remaining in it deteriorate the other resin, and that the novolak resin contains a relatively large amount (for example, about 0.5 to 2% by weight) of free phenol because of the use of an excess of phenol as a starting material.

A process for producing cured novolak resin fibers was recently suggested which comprises heating a novolak resin at a high temperature to form a product having a considerably high degree of condensation, purifying the product by removing components having a low degree of condensation, thereby to obtain a product having a relatively high degree of condensation and comprising phenol moieties linked to each other by 7 to 10 methylene groups, melt-spinning the product to form novolak fibers, dipping the fibers in an aqueous solution of hydrochloric acid and formaldehyde and gradually heating the solution from room temperature to allow curing reaction to proceed from the surface of the fibers (Japanese Patent Publication No. 11284/1973). This process requires an extra step for the formation of the novolak resin having a high degree of condensation. Furthermore, when this resin is pulverized without being converted to fibers, and subjected to an external curing treatment, it is almost impossible to allow the curing reaction to proceed uniformly to the interior of the resin. Granules or powders obtained by cutting or pulverizing the cured fibers are expensive, and do not possess good flow characteristics.

On the other hand, the known resol resins are produced usually by reacting phenol with an excess of formaldehyde in the presence of a basic catalyst (about 0.2 to 2%) such as sodium hydroxide, ammonia or an organic amine while maintaining the mole ratio of phenol to formaldehyde at, for example, 1:1-2. The resol resins so produced contain mono-, di- and trimers of phenol having a relatively large amount of methylol groups as main components and are very reactive. It is the usual practice therefore to store them in a refrigerator as a water or methanol solution having a solids concentration of not more than 60%. The period for which such storage is possible is about 3 to 4 months at the longest. To mold and cure such a resol resin, the water or methanol is removed and the resin is heated in the optional presence of an acid catalyst. The rate of this curing reaction is very high, and, for example at 150° C., gellation occurs within several tens of seconds.

Since the resol resin has very high reactivity, it cannot be obtained as a stable granular or powdery solid. Furthermore, because a cured product of the resol resin has a highly developed three-dimensional structure, it is very hard and its conversion to a fine granular or powdery molding material is quite difficult (Japanese Patent Publication No. 12958/1978).

Several years ago, a process was disclosed which comprises reacting a phenol and formaldehyde in the presence of at least a nitrogen-containing compound, and reacting the resulting condensate with a hydrophilic polymeric compound to form a granular or powdery resin (Japanese Patent Publication No. 42077/1978). The resulting resin in the nongelled state contains as much as about 5 to 6% of free phenol (Examples 1 to 4 of the cited Japanese patent document), and a gelled product of the resin (Example 5 of the Japanese patent document) is a very hard non-reactive resin. Molded articles obtained from the gelled resin have deteriorated properties because of its inclusion of the nitrogen-containing compound used as catalyst or the hydrophilic polymeric compound.

A process is also known which comprises reacting a phenol and formaldehyde in a basic aqueous solution, mixing the resulting prepolymer with a protective colloid, and coagulating the prepolymer under acidity to form inert solid beads (Japanese Patent Publication No. 13491/1976). The coagulated product corresponds to a cured product of a resol resin, and has no reactivity. Furthermore, since it contains a salt or acid and the protective colloid, molded articles prepared from it have degraded properties.

SUMMARY OF THE INVENTION

It is a first object of this invention to provide a granular or powdery phenol-formaldehyde resin which has high storage stability and good flow characteristics, and is reactive when heated singly or in admixture with another resin.

A second object of this invention is to provide a phenol-formaldehyde resin which is in the form of a very fine granular or powdery solid and therefore has good flow characteristics and, for example, can be smoothly passed through minute nozzles in injection molding and which can be used as a reactive filler.

A third object of this invention is to provide a granular or powdery phenol-formaldehyde resin which has fusibility under heat, for example at 100° C.

A fourth object of this invention is to provide a granular or powdery phenol-formaldehyde resin which has a free phenol content of as low as not more than 50 ppm, is safe and easy to handle and does not give rise to a pollution problem.

A fifth object of this invention is to provide a granular or powdery phenol-formaldehyde resin which has good storage stability at ordinary temperature, and either singly or together with another resin can be molded into an article having superior heat resistance, thermal insulation, mechanical properties and/or electrical properties.

An additional object of this invention is to provide a novel industrial process for producing a novel granular or powdery phenol-formaldehyde resin having the various advantages given in the above description of the first to fifth objects of the invention.

These objects and advantages are achieved in accordance with this invention by a granular or powdery resin which is a condensation product of a phenol and formaldehyde, said granular or powdery resin being characterized by (A) containing spherical primary particles and secondary particles resulting from the agglomeration of the primary particles, each of said particles having a particle diameter of 0.1 to 150 microns, (B) having such a size that at least 50% by weight thereof can pass through a 100 Tyler mesh sieve, (C) having a free phenol content, determined by liquid chromatography, of not more than 50 ppm, (D) having a $D_{990-1015}/D_{1600}$ ratio of from 0.2 to 9.0 and a $D_{890}/D_{1600}$ ratio of from 0.09 to 1.0 in its infrared absorption spectrum measured by a KBr tablet method, wherein $D_{1600}$ represents the absorption intensity of an absorption peak at 1600 cm$^{-1}$ assigned to benzene, $D_{990-1015}$ represents the highest absorption intensity of absorption peaks at 990 to 1015 cm$^{-1}$ assigned to the methylol groups, and the $D_{890}$ represents the absorption intensity of an absorption peak at 890 cm$^{-1}$ assigned to a lone hydrogen atom of the benzene ring, and (E) having a weight increase by acetylation, I defined by the following equation, of 23 to 40% by weight, $$I = (W_1 - W_o)/W_o \times 100 \ (\%)$$

wherein $W_o$ is the weight in grams of said resin before acetylation, and $W_1$ is the weight in grams of the resin after acetylation, said acetylation being carried out by gradually heating 10 g of said resin from room temperature to 115° C. over the course of 45 minutes in 300 g of an acetylation bath consisting of 78% by weight of acetic anhydride, 20% by weight of acetic acid and 2% by weight of orthophosphoric acid and maintaining it at 115° C. for 15 minutes.

We have found that the novel granular or powdery phenol-formaldehyde resin of the invention can be produced by a process which comprises contacting a phenol with a hydrochloric acid-formaldehyde bath containing 5 to 28% by weight of hydrochloric acid and 3 to 25% by weight of formaldehyde with the total concentration of hydrochloric acid and formaldehyde being 15 to 40% by weight, while maintaining a bath ratio, defined by the quotient of the weight of the hydrochloric acid-formaldehyde bath divided by the weight of the phenol, of at least 8, said contacting being effected such that after contacting of the phenol with the bath, white suspended particles are formed and thereafter developed into a pink-colored granular or powdery solid.

BRIEF DESCRIPTION OF THE DRAWINGS

FIGS. 1A to 4A are microphotographs of the granular or powdery resin of the invention taken through an optical microscope with a magnification of 200, in which the minimum marked interval of the scale is 10μ;

FIGS. 1B to 4B are microphotograhs of the granular or powdery resin of the invention taken through a scanning electron microscope with a magnification of 1000.

DETAILED DESCRIPTION OF THE INVENTION

[Process]

Figure 5:
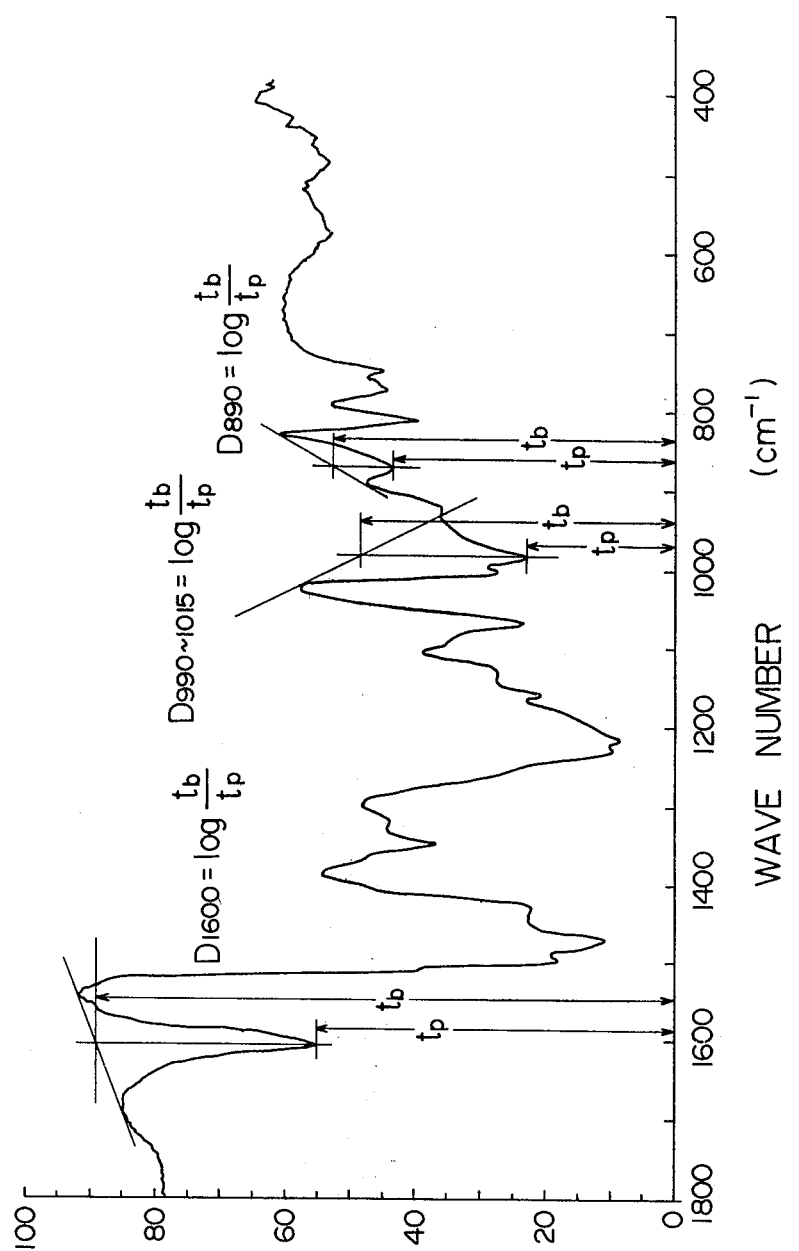
FIG. 5 is an infrared absorption spectral chart of the granular or powdery resin of the invention, and also shows how to determine the absorption intensity of a peak at a specified wavelength.

According to the process of this invention, a phenol is contacted with an HCl-formaldehyde bath containing (a) hydrochloric acid (HCl) in a concentration of 5 to 28% by weight and (b) formaldehyde (HCHO) in a concentration of 3 to 25% by weight with (c) the total concentration of hydrochloric acid and formaldehyde being 15 to 40% by weight, while maintaining a bath ratio, defined by the quotient of the weight of the HCl-formaldehyde bath divided by the weight of the phenol, of at least 8, preferably at least 10.

Preferably, the hydrochloric acid-formaldehyde bath further meets the requirement (d) that the mole ratio of the formaldehyde in the bath to the phenol contacted with the bath should be at least 2, especially at least 2.5, above all at least 3. There is no particular upper limit to the mole ratio specified by the requirement (d), but preferably it is 20, especially 15. Molar ratios above the preferred upper limit are not economically advantageous. On the other hand, when the mole ratio decreases below 2.5, especially below 2, the rate of the reaction decreases, and a uniform and fine granular or powdery resin is difficult to obtain. The especially suitable range of the mole ratio is from 4 to 15. Mole ratios of at least 2, preferably at least 2.5, are especially effective when the bath ratio is relatively low, for example from 8 to 10.

In the present invention, the contacting of the phenol with the HCl-formaldehyde bath is effected while maintaining the bath ratio of the bath at 8 or more, preferably 10 or more. The important feature of the present invention is that the HCl-formaldehyde bath having a considerably high HCl concentration and containing formaldehyde in excess of the phenol is contacted with the phenol at a bath ratio of as high as at least 8, preferably at least 10. These conditions for the reaction of the phenol and formaldehyde are basically different from the reaction conditions for the production of the known novolak resins and resol resins.

In the HCl-formaldehyde bath used in this invention, the preferred concentration of hydrochloric acid is 10 to 25% by weight, especially 15 to 22% by weight; the preferred concentration of formaldehyde is 5 to 20% by weight, especially 7 to 15% by weight; and the preferred total concentration of HCl and formaldehyde is 20 to 35% by weight, especially 25 to 32% by weight.

Preferably, the bath ratio to be maintained during the contacting of the HCl-formaldehyde bath with the phenol is at least 10, especially from 15 to 40.

Furthermore, according to the process of this invention, the contacting of the phenol with the HCl-formaldehyde bath is effected such that after the contacting of the phenol with the bath, white suspended particles are formed and thereafter developed into a pink-colored granular or powdery solid. Conveniently, this contacting is effected such that by addition of the phenol to the HCl-formaldehyde bath, a clear solution is first formed, and then white suspended particles are formed in the solution and thereafter developed into a pink-colored granular or powdery solid. It is preferred that before the white suspended particles are formed after the addition of the phenol to the bath, the bath be stirred to form a clear, preferably uniform, solution of the phenol and the bath, and that after the formation of the white suspended particles until the suspended particles change to a pale pink-colored solid, the bath (reaction mixture) be not subjected to a mechanical shearing force such as stirring.

If desired, the phenol to be added may be diluted with formalin, an aqueous solution of hydrochloric acid, water, etc. prior to the addition. It is preferred to dilute the phenol with a formaldehyde solution having a formaldehyde concentration of 3 to 44% by weight, preferably 20 to 40% by weight and use a diluted solution of the phenol having a phenol concentration of 50 to 95% by weight, especially 70 to 90% by weight, as the starting phenol. It is essential in this case to control the diluted solution of the phenol such that after its addition to the HCl-formaldehyde bath, the bath meets the requirements (a), (b) and (c), preferably (a), (b), (c) and (d).

The suitable temperature of the HCl-formaldehyde bath at the time of adding the phenol or its diluted solution is not more than 90° C., preferably not more than 70° C. If the temperature of the bath is higher than 40° C., especially higher than 50° C., the rate of the reaction of the phenol with formaldehyde becomes high. Hence, it is preferred in this case to use the phenol as a diluted solution in the aforesaid formaldehyde solution. It is also preferred to contact the phenol or its diluted solution in the form of fine streams or finest possible droplets because the rate of reaction is high.

When the bath temperature is higher than 40° C., especially higher than 50° C., the rate of the reaction of the phenol with formaldehyde becomes higher as the temperature of the bath becomes higher. Within a short period of as short as several minutes after the contacting of the phenol with the bath or instantaneously upon the contacting, white suspended particles are formed and rapidly developed into a pink-colored granular or powdery solid.

For convenience, the process of this invention is roughly classified into an embodiment in which the temperature of the HCl-formaldehyde bath is maintained at 35°-40° C. or higher, and the phenol or its diluted solution is added to the bath (embodiment 1), and an embodiment in which the temperature of the HCl-formaldehyde bath is maintained at lower than 35°-40° C., and the phenol or its diluted solution is added to the bath (embodiment 2).

These embodiments will be described in detail below.

Embodiment 1

According to this embodiment, the HCl-formaldehyde bath is maintained at a temperature of at least 35° C., preferably higher than 40° C. but not higher than 95° C., and the phenol or its diluted solution is gradually added in the form of fine streams or droplets, preferably finest possible droplets, to the bath. Upon contacting of the fine streams or droplets with the bath, white suspended particles are continuously formed instantaneously or within a period of several minutes, and then developed into a pink-colored granular or powdery phenol-formaldehyde resin. When the temperature of the bath is 60° to 95° C. in this embodiment, the reaction of the phenol with formaldehyde rapidly proceeds.

When the temperature of the bath is lower than 60° C., it is also possible to raise the temperature of the reaction mixture to 70° to 95° C. over a suitable period of time after the formation of the white suspended particles to complete the desired reaction.

According to this embodiment, a granular or powdery phenol-formaldehyde resin having a higher degree of curing is generally obtained as the temperature of the HCl-formaldehyde bath to which the phenol or its diluted solution is to be added is higher and the temperature of the reaction mixture before the completion of the reaction is higher.

Embodiment 2

According to this embodiment, the phenol or a solution obtained by diluting it with the aforesaid aqueous solution of formaldehyde is added to the HCl-formaldehyde bath maintained at less that 40° C. to form a clear solution. Then, white suspended particles are formed in the solution, and thereafter developed into a pink-colored granular or powdery phenol-formaldehyde resin.

It is especially advantageous in embodiment 2 to form a uniform solution by adding the phenol or its diluted solution to the HCl-formaldehyde bath. A granular or powdery solid having a very small average particle diameter can be formed by controlling the reaction condition such that white suspended particles are formed and then developed into a pink-colored particulate solid.

Preferably, stirring is effected in order to form a uniform solution by adding the phenol or its diluted solution to the HCl-formaldehyde bath. It is preferred however that this stirring be stopped before the white suspended particles are formed, or as rapidly as possible after the formation of the white suspended particles begins. If the stirring is continued even after the white suspended particles are formed, the white suspended particles gather to form a sticky paste-like mass and the yield of the fine particles is correspondingly decreased.

If the temperature of the HCl-formaldehyde bath to which the phenol or its diluted solution is to be added is as low as not more than 15° C., especially not more than 10° C., and the phenol or its solution is added all at a time to the bath, a uniform solution can be formed by continuously stirring the mixture. Since, however, the rate of the reaction of the phenol with formaldehyde becomes lower as the temperature of the bath becomes lower, long periods of time are required until white suspended particles are formed, and the time required for the resulting white suspended particles to grow into a pink-colored stable granular or powdery solid becomes correspondingly longer. Accordingly, if the stirring is stopped after the formation of the white suspended particles, the white suspended particles settle to the bottom of the bath before they grow into stable pink-colored particles, and the condensation reaction between the phenol and formaldehyde proceeds while the suspended particles are settled and accumulated in this way. Hence, a sticky paste-like or a plate-like lumpy solid results, and the amount of the desired granular or powdery product is correspondingly decreased.

For the foregoing reasons, it is preferred to maintain the HCl-formaldehyde bath at a temperature of 10° to 35° C., especially 15° to 35° C., and add the phenol or its diluted solution to the bath maintained at this temperature. By this procedure, a uniform solution can be formed batchwise by adding a required amount of the phenol all at a time to the bath, and then white suspended particles can be formed and developed smoothly into a pink-colored fine granular or powdery solid. Since the reaction of the phenol with the HCl-formaldehyde bath in this invention is a relatively mild exothermic reaction, the desired reaction can be carried out under the aforesaid conditions without involving the sedimentation and accumulation of the white suspended particles even when no particular heating by an external heating source is effected.

In the embodiment 2, when the white suspended particles are formed, they turn milk-white with the lapse of time, and usually the entire reaction mixture in the bath becomes fairly deep milk-white. Thereafter, it turns pale pink, and with the lapse of time, it turns deep pink.

The white suspended particles which are formed in accordance with embodiment 2 after first forming a uniform solution by adding the phenol or its diluted solution to the HCl-formaldehyde bath maintained at 10° to 35° C., especially 15° to 35° C., may be converted to a pink-colored granular or powdery solid with or without heating by an external heat source.

As stated above, when after the formation of white suspended particles in the bath, the white suspended particles are maintained in the bath with or without temperature elevation, they turn milk-white and then pale pink, and finally grow into a deep pink granular or powdery solid. The exothermic reaction substantially ceases at some point in this stage. Since at this point the granular or powdery solid is stable, it is permissible to stir the bath again. Alternatively, after this stable state has been reached, one may filter the bath to separate the granular or powdery solid, and put the separated solid in another HCl-formaldehyde bath (to be referred to as a second bath) preferably meeting the requirements (a), (b) and (c) specified hereinabove to complete the desired reaction. The second bath may have a lower formaldehyde concentration and/or HCl concentration than the HCl-formaldehyde bath (to be referred to as a first bath) to which the phenol or its diluted solution is first added. Since the granular or powdery solid to be added to the second bath contains only a very small amount of free phenol or contains substantially no free phenol, the bath ratio of the second bath to the solid added needs not to be at least 8 as in the first bath, and may be less than 8. The temperature of the second bath is preferably not more than 90° C., but may be higher.

The granular or powdery solid obtained in embodiment 2 by completing the desired reaction at a temperature of less than about 50° C. after the formation of white suspended particles has not undergone sufficient curing reaction. Accordingly, it shows heat fusibility in a heat fusibility test at 100° C. to be described hereinbelow.

On the other hand, a granular or powdery solid obtained by adding substantially all of the phenol or its diluted solution with stirring to the HCl-formaldehyde bath maintained at less than 40° C., preferably 15° to 35° C., to form a clear solution, then allowing white suspended particles to be formed without agitation, developing them into a pale pink granular or powdery solid with or without temperature elevation, and heating the solid at a temperature higher than 50° C., preferably at 70° to 95° C., to complete the reacton has undergone a higher degree of curing reaction. Accordingly, such a granular or powdery solid has reduced heat fusibility or substantially no fusibility at 100° C., or shows heat fusibility at a higher temperature, for example at 200° C., or has substantailly no fusibility at such a high temperature. This type of the granular or powdery solid is particularly useful as a filler to be used together with another resin.

Examples of suitable phenols for use in this invention are phenol, m-cresol, resorcinol, hydroquinone, and mixtures of these.

Phenol is most suitable. The phenol used in this invention may also be a mixture of at least 80% by weight, especially at least 85% by weight, or phenol with at least one known phenol derivative, for example o-cresol, m-cresol, p-cresol, bisphenol A, o-, m- or p-($C_2$-$C_4$ alkyl) phenols, p-phenylphenol, xylenol and resorcinol.

The granular or powdery phenol-formaldehyde resin solid obtained by the above procedure after completing the desired reaction may be worked up into a final desired product by separating it from the HCl-formaldehyde bath and washing it with water, and preferably neutralizing the adhering hydrochloric acid with an aqueous alkaline solution and washing the product.

Aqueous solutions of alkali metals, preferably aqueous solutions of alkali metals obtained by dissolving them in an aqueous solution of ammonia or a methanolic aqueous solution of ammonia, may be used as the aqueous alkaline solution. The suitable concentration of ammonia in such a solution is 0.1 to 5% by weight, especially 0.3 to 3% by weight. When the methanolic aqueous solution is to be used, the suitable concentration of methanol is 20 to 80% by weight, preferably 35 to 60% by weight. Advantageously, the neutralization with the aqueous alkaline solution is carried out at a temperature of 20° to 90° C., preferably 40° to 70° C.

The granular or powdery solid obtained after the above washing treatment with or without the subsequent neutralization and washing may be dehydrated and offered directly for end uses. Or it may be offered for end uses after drying it in a customary manner. Or before or after the drying, it may be pulverized lightly by any desired pulverizing machine.

[Granular or powdery resin]

According to this invention, there is obtained a granular or powdery resin which is a condensation product of a phenol with formaldehyde, said granular or powdery resin being characterized by (A) containing spherical primary particles and secondary particles resulting from the agglomeration of the primary particles, each of the particles having a particle diameter of 0.1 to 150 microns, (B) having such a size that at least 50% by weight thereof can pass through a 100 Tyler mesh sieve, (C) having a free phenol content, determined by liquid chromatograhy, of not more than 50 ppm, (D) having a $D_{990-1015}/D_{1600}$ ratio of from 0.2 to 9.0 and a $D_{890}/D_{1600}$ ratio of from 0.09 to 1.0 in its infrared absorption spectrum measured by a KBr tablet method, wherein $D_{1600}$ represents the absorption intensity of an absorption peak at 1600 cm$^{-1}$ assigned to benzene, $D_{990-1015}$ represents the highest absorption intensity of absorption peaks at 990 to 1015 cm$^{-1}$ assigned to the methlol groups, and the $D_{890}$ represents the absorption intensity of an absorption peak at 890 cm$^{-1}$ assigned to a lone hydrogen atom of the benzene ring, and (E) having a weight increase by acetylation, I defined by the following equation, of 23 to 40% by weight, $$I = (W_1 - W_o)/W_o \times 100 \ (\%)$$

wherein $W_o$ is the weight in grams of said resin before acetylation, and $W_1$ is the weight in grams of the resin after acetylation,
said acetylation being carried out by gradually heating 10 g of said resin from room temperature to 115° C. over the course of 45 minutes in 300 g of an acetylation bath consisting of 78% by weight of acetic anhydride, 20% by weight of acetic acid and 2% by weight of orthophosphoric acid and maintaining it at 115° C. for 15 minutes.

The limitations (A) to (E) attached to the granular or powdery phenol-formaldehyde resin (to be sometimes referred to as the product of the invention) are measured by the methods to be described hereinbelow.

A first feature of the product of the invention is that it contains spherical primary particles and secondary particles resulting from the agglomeration of the primary particles, each having a particle diameter of 0.1 to 150 microns, preferably 1 to 150 microns, more preferably 1 to 100 microns as specified in (A) above which is quite different from a forcibly pulverized product of a cured product of a known novolak or resol resin or a pulverization product of known cured novolak fibers. This fact is clearly demonstrated by the optical microphotographs and scanning electron microphotographs attached to this application as FIGS. 1A to 4A and 1B to 4B.

As shown in FIGS. 1 to 4, at least 30%, preferably at least 50%, of the granular or powdery resin product of this invention consist of spherical primary particles and secondary agglomerated particles having a particle diameter of 0.1 to 150 microns, preferably 1 to 150 microns, more preferably 1 to 100 microns. The expression 30% or 50% means that as defined in the description of the method for measuring the particle diameter given hereinbelow, it is 30% or 50% based on the number of entire particles (including the secondary agglomerated particles) of the resin in one visual field of an optical microscope having a magnification of 100 to 1,000. It is preferred that 70% to substantially 100% of the granular or powdery product of the invention consist of spherical primary particles and secondary agglomerated particles each having a particle diameter of 0.1 to 150 microns. Especially preferably, at least 30%, especially at least 50%, of the number (as an average of those in five visual fields) of particles in the visual field of an optical microphotograph in accordance with the above definition consists of spherical primary particles and secondary agglomerated particles having a particle diameter in the range of 1 to 100 microns, preferably 1 to 50 microns.

That the individual particles of the granular or powdery resin product of this invention are composed of spherical primary particles and secondary agglomerated particles each having a very small particle diameter is presumably because the process of this invention involves adding the phenol (or its diluted solution) to the HCl-formaldehyde bath to form a uniform solution at least partly, then forming very small white suspended particles in the solution, and developing the white suspended particles into stable pink-colored granular or powdery particles which have undergone curing reaction to some extent.

Since the granular or powdery resin product of this invention is formed mainly of the minute spherical primary particles and the secondary agglomerated particles thereof, it is very small in size as specified in (B) above. Thus, at least 50% by weight, preferably at least 70% by weight, especially preferably at least 80% by weight, of the entire resin passes through a 100 Tyler mesh sieve. The expression "passing through the sieve" does not exclude the exertion of a force which does not cause forcible destruction of the particles (including the secondary agglomerated particles) in the procedure of screening the granular or powdery product through the sieve, for example light crumpling of the granular or powdery product by hand, light pushing or levelling of the particles on the mesh by means of a plectrum-like piece, or light tapping of the particles by hand.

As specified in (C) above, the granular or powdery product of the invention has a free phenol content, determined by liquid chromatography, of not more than 50 ppm, preferably not more than 40 ppm, above all not more than 20 ppm. That the product of the invention has a very low free phenol content is also presumably because the process of the invention comprises adding the phenol or its diluted solution to the HCl-formaldehyde bath to form a uniform solution at least partly, then forming very fine white suspended particles and developing them into stable pink-colored fine particles, and therefore, substantially all of the phenol added, especially the phenol which participates in the formation of the product of the invention, reacts with formaldehyde. The granular or powdery products obtained by the methods disclosed in Japanese Patent Publication No. 42077/1978 cited above has a free phenol content of as high as 0.3 to about 6% by weight. In contrast, the granular or powdery product of the invention is quite small, and this fact is an important advantage of granular or powdery products of this kind and is very surprising.

Furthermore, the granular or powdery product of the invention has a $D_{990-1015}/D_{1600}$ ratio of from 0.2 to 9.0 and a $D_{890}/D_{1600}$ ratio of from 0.09 to 1.0 in its infrared absorption spectrum. Preferably, it has a $D_{990-1015}/D_{1600}$ ratio of from 0.3 to 7.0, especially from 0.4 to 5.0, and a $D_{890}/D_{1600}$ ratio of from 0.1 to 0.9, especially from 0.12 to 0.8.

It is widely known that in the infrared absorption spectrum of a phenol-formaldehyde, the peak at $D_{1600}$ shows an absorption assigned to the benzene ring, the peak at $D_{990-1015}$ shows an absorption assigned to the methylol group, and the peak at $D_{890}$ shows an absorption assigned to a lone hydrogen atom of the benzene ring.

That the product of the invention has a $D_{990-1015}/D_{1600}$ ratio of from 0.2 to 9.0 shows that the product of the invention contains at least some amount of methylol groups, and the content of the methylol groups can be adjusted over a fairly wide range. The preferred product of the invention having a $D_{990-1015}/D_{1600}$ of from 0.3 to 7.0, especially from 0.4 to 5.0, contains methylol groups in a moderate concentration and is more stable.

That the product of the invention has a $D_{890}/D_{1600}$ ratio of from 0.09 to 1.0, preferably from 0.1 to 0.9, above all from 0.12 to 0.8, in its infrared absorption spectrum shows that the sites (the ortho- and meta-positions) of reaction of phenol molecules which participate in the reaction are moderately blocked by methylene linkages or methylol groups.

Cured productions of known resol resins generally have a lower $D_{990-1015}/D_{1600}$ ratio and/or a lower $D_{890}/D_{1600}$ ratio, and the cured product of a novolak resin obtained with the use of hexamine generally has a lower $D_{890}/D_{1600}$ ratio than the lower limit (0.09) in the product of this invention.

Furthermore, as specified in (E) above, the granular or powdery product of the invention has a weight increase by acetylation of 23 to 40% by weight, preferably 25 to 37% by weight, above all 27 to 35% by weight. This characteristic shows that the product of the invention has an acetylable phenolic hydroxyl group and a methylol group corresponding to the weight increase by acetylation.

The granular or powdery resin product is characterized by having the characteristics (A) to (E) described hereinabove.

The granular or powdery resin product of this invention has very good flowability because it contains spherical primary particles and secondary agglomerated particles each having a particle diameter of 0.1 to 150 microns, preferably 1 to 150 microns, more preferably 1 to 100 microns, [the characteristic (A)] preferably in a proportion of at least 50%, and at least 50% by weight, preferably at least 70% by weight, of these particles can pass through a 100 Tyler mesh sieve [the characteristic (B)]. It can be mixed in a relatively large amount with another resin, and the resulting mixture, when used as an injection molding material, can be smoothly extruded without blocking up nozzles. Since the particulate products of the invention contain very minute spherical primary particles as a basic constituent element, cured molded articles prepared from such products as fillers show superior mechanical properties, particularly high resistance to compression. Furthermore, since the granular or powdery resin product of this invention is obtained by the reaction of the fine white suspended particles (the initial-stage reaction product of the phenol with formaldehyde), it is very stable at ordinary temperature. Moreover, since it contains a considerable amount of methylol groups, it has reactivity in the heated state. It exhibits reactivity when it is molded and heat-cured either singly or together with another molding material such as resol resins, other resins and rubbers. Hence, it can be molded into articles having superior physical and mechanical properties, thermal insulation, heat resistance and electrical properties, as shown in the following working examples.

Since the granular or powdery resin of this invention has a free phenol content of not more than 50 ppm, preferably not more than 40 ppm, above all not more than 20 ppm [characteristic (C)], it is safe and very easy to handle. Accordingly, even when it is used as a binder, etc. in the formation of paper-like sheets of asbestos or synthetic resins or in the production of nonwoven fabrics, not only the resulting products but also the waste liquors contain only a very small amount of free phenol, and do not cause pollution. Furthermore, when it is molded in admixture with another resin, no side-reaction attributed to phenol takes place, and no deterioration in property due to free phenol occurs in the molded articles.

As stated above, the granular or powdery resin product of the invention has a weight increase by acetylation of 23 to 40% by weight, preferably 25 to 37% by weight, preferably 27 to 35% by weight. The acetylated granular or powdery resin has a light reflectance (%), measured at a wavelength of 500 m$\mu$ by a reflection spectral method described hereinbelow, of at least 75%, mostly at least about 80%, and at times, as high as 90%.

The granular or powdery resin of the invention has a light reflectance of about 50 to about 70%, and by acetylation as described above, it is converted to a granular or powdery resin having a higher degree of whiteness.

The granular or powdery resin of the invention as obtained may be the one whose curing reaction has not fully proceeded, or the one whose curing reaction has proceeded relatively sufficiently, according to the process of this invention. As a result, when pressed for 5 minutes at 100° C. in accordance with the method of measuring heat fusibility to be described hereinbelow, the granular or powdery resin of the invention is either (a) a lumpy or plate-like product as a result of partial fusion, or (b) a granular or powdery product without substantial melting or fusion.

Elemental analysis has shown that the granular or powdery resin of this invention consists substantially of carbon, hydrogen and oxygen, and has the following composition, i.e.

C: 70–80% by weight,
H: 5–7% by weight, and
O:17–21% by weight (the total being 100% by weight).

The granular or powdery resin of the invention has a solubility in methanol, measured by the testing method to be described hereinbelow, of not more than 20% by weight, preferably not more than 15% by weight. In particular, the granular or powdery resin product (b) mentioned above has a solubility in methanol of usually not more than 5% by weight, and thus shows high resistance to dissolution in methanol. In contrast, the methanol solubility of the granular or powdery resin product (a) mentioned above is usually higher than that of the product (b).

The granular or powdery resin of the invention usually does not substantially contain a nitrogen-containing basic compound or a hydrophilic polymeric compound because it is produced by the process of this invention which does not substantially require the presence of the nitrogen-containing basic compound or hydrophilic polymeric compound in the reaction system. Accordingly, when it is molded, and heat-cured either alone or in combination with another resin or a rubber, there is no likelihood of deteriorating the properties of the molded articles by such compounds.

As stated hereinabove, the granular or powdery phenolformaldehyde resin product of the invention is very fine, has good storage stability and flow characteristics and a very low free phenol content, and contains some amounts of methylol groups. Therefore, it has the excellent advantage of having reactivity when molded and heated either singly or together with another resin or a rubber. The product (a) which at least partly shows fusibility when heated at 100° C. for 5 minutes in accordance with the heat fusibility test to be described is especially useful as a binder or a filler for the production of heat-resistant or thermally insulative molded articles. The product (b) which does not show fusibility by the above test is especially useful as a filler for the production of heat-resistant, thermally insulative or high impact molded articles and carbonized molded articles.

The following examples illustrate the present invention more specifically. The various data given in these examples were measured by the following methods.

1. Content of particles having a particle size of 0.1 to 150μ:

A portion weighing about 0.1 g was sampled from five different sites of one sample.

A part of each of the 0.1 g portions so sampled was placed on a slide glass for microscopic examination. The sample on the slide glass was spread to minimize accumulation of particles for easy observation.

The microscopic observation was made with regard to that part of the sample in which about 10 to about 50 primary particles and/or the secondary agglomerated particles thereof were present in the visual field of an optical microscope usually having a magnification of 100 to 1000. The sizes of all particles existing in the visual field of the optical microscope were read by a measure set in the visual field of the optical microscope and recorded.

The content (%) of particles having a size of 0.1 to 150μ can be calculated in accordance with the following equation.

Content (%) = $(N_1/N_o) \times 100$ $N_1$: the total number of particles whose sizes were read in the visual field under the microscope, and
$N_o$: the number of those particles in $N_1$ which had a size of 0.1 to 150μ.

For each sample, the average of values obtained from the five sampled portions was calculated.

2. Amount of particles which passed through a 100 Tyler mesh sieve:

About 10 g of a dried sample, if desired after lightly crumpled by hand, was accurately weighed. Over the course of 5 minutes, the sample was put little by little in a 100 Tyler mesh sieve vibrator (the opening size of the sieve 200 mm in diameter; vibrating speed 200 rpm). After the end of addition, the sieve was vibrated further for 10 minutes. The amount of the particles which passed through the 100 Tyler mesh sieve was calculated from the following equation.

Amount (% by weight) = $(\omega_o - \omega_1)/\omega_o \times 100$ $\omega_o$: the amount of the sample put in the sieve (g),
$\omega_1$: the amount of the sample which remained on the 100 Tyler mesh sieve (g).

3. Free phenol content:

About 10 g of the sample which passed through the 100 Tyler mesh sieve was precisely weighed, and heat-treated under reflux for 30 minutes in 190 g of 100% methanol. The heat-treated product was filtered through a glass filter (No. 3). The filtrate was subjected to high-performance liquid chromatography to determine the phenol content of the filtrate. The free phenol content of the sample was determined from a calibration curve separately prepared.

The operating conditions of high-performance liquid chromatography were as follows:
Device: Model 6000 A made by Waters Co., U.S.A.
Column carrier: μ-Bondapak $C_{18}$
Column: ¼ inch in diameter and 1 foot in length
Column temperature: room temperature
Eluent: methanol/water (3/7 by volume)
Flow rate: 0.5 ml/min.
Detector: UV (254 nm), range 0.01 (1 mV)

The phenol content of the filtrate was determined from a separately prepared calibration curve (showing the relation between the phenol content and the height of a peak based on phenol).

4. Infrared absorption spectrum and absorption intensities

The infrared absorption spectrum of a sample prepared by a usual KBr tablet method was measured by means of an infrared spectrophotometer (Model 225 made by Hitachi Limited).

The absorption intensity at a specified wavelength was determined in the following way.

A base line is drawn tangent to a peak whose absorption intensity is to be determined in the measured infrared absorption spectral chart. Let the transmittance of the vertex of the peak be $t_p$ and the transmittance of the base line at the specified wavelength be $t_b$, then the absorption intensity D at the specified wavelength is given by the following equation.

$$D = \log(t_b/t_p)$$

Accordingly, the ratio of the absorption intensity of the peak at 890 $cm^{-1}$ to that of the peak at 1600 $cm^{-1}$ is given by the ratio of the respective absorption intensities determined by the above equation (i.e., $D_{890}/D_{1600}$).

5. Weight increase by acetylation

About 10 g of a dry sample was precisely weighed, and added to about 300 g of an acetylation bath consisting of 78% by weight of acetic anhydride, 20% by weight of acetic acid and 2% by weight of orthophosphoric acid. Then, the temperature was gradually raised from room temperature to 115° C. over the course of 45 minutes. The sample was further maintained at 115° C. for 15 minutes. Then, the bath was allowed to cool, and filtered on a No. 3 glass filter while being sucked by an aspirator carefully. The filtrate was fully washed with hot water on the glass filter, and finally washed with a small amount of cold methanol. Then, the residue on the glass filter was dried together with the glass filter in a dessicator at 70° C. for 2 hours, and allowed to stand for a day and night in a dessicator containing silica gel as a drying agent. The dry weight of the residue on the filter was precisely weighed.

The weight increase by acetylation, I, is given by the following equation.

$I = (W_1 - W_o)/W_o \times 100$ $W_o$: the precisely measured weight (g) of the dry sample before acetylation, $W_1$: the precisely measure weight (g) of the dry sample after acetylation.

6. Light reflectance (reflection spectral method)

By using a two-wavelength spectrophotometer (Model 557 made by Hitachi Limited), the light reflectance (%) of a sample acetylated by the method described in section 5 above at a wavelength of 500 m$\mu$ was measured. The reflectance of a standard white plate was taken as 100%.

7. Heat fusibility at 100° C.

About 5 g of a sample which passed through a 100 Tyler mesh sieve was interposed between two 0.2 mm-thick stainless steel sheets, and the assembly was pressed under an initial pressure of 50 kg for 5 minutes by means of a hot press kept at 100° C. (a single acting compression molding machine manufactured by Shinto Kinzoku Kogyosho Co., Ltd.). The press was released, and the hot-pressed sample was taken out from between the two stainless steel sheets, and observed. When it was found that the sample so taken out was in the form of a flat plate as a result of melting or fusion, it was judged that the sample had fusibility. When no appreciable difference was noted after the hot pressing, the sample was determined to have infusibility.

8. Alcohol resistance

About 10 g of a sample was precisely weighed (the precisely measured weight is given by $W_0$), and heat-treated under reflux for 30 minutes in about 500 ml of 100% methanol. The mixture was filtered on a glass filter (No. 3). The sample remaining on the filter was washed with about 100 ml of methanol. Then, the sample remaining on the filter was dried at 70° C. for 2 hours. The weight of the dried sample was precisely weighed (the precisely measured weight is given by $W_{11}$). The solubility of the sample in methanol was calculated from the following equation. The lower the solubility in methanol, the higher the alcohol resistance.

Solubility in methanol $= (W_0 - W_{11})/W_0 \times 100$

9. Hydroxyl value

Measured in accordance with the method for measuring the hydroxyl value described in a Japanese-language publication (General Testing Method 377, Commentary on the Standards of Raw Materials for Cosmetics, 1st edition, published by Yakuji Nippo Sha, 1975).

10. Bulk density

A sample which passed through a 100 Tyler mesh sieve was poured into a 100 ml measuring cylinder whose brim corresponded to a 100 ml indicator mark) from a height 2 cm above the brim of the measuring cylinder. The bulk density of the sample is defined by the following equation.

Bulk density (g/ml) = (W (g)/100 (ml))

W: the weight in grams of the sample per 100 ml

EXAMPLE 1

(1) A 2-liter separable flask was charged with 1,500 g of a mixed aqueous solution at 25° C. of hydrochloric acid and formaldehyde having each of the compositions shown in Table 1, and 62.5 g of a mixed aqueous solution (25° C.) containing 80% by weight of a phenol and 5% by weight of formaldehyde prepared from 98% by weight phenol (the remaining 2% by weight being water), 37% by weight formalin and water. The mixture was stirred for 20 seconds after the addition, and then left to stand for 60 minutes. During the 60-minute standing, the contents in the separable flask remained clear (Runs Nos. 1 and 20 in Table 1), or changed from a clear solution to a solution containing white suspended particles (Runs 3, 9 and 18 in Table 1), or changed from a clear solution to a white turbid solution and finally to a solution containing pale pink-colored suspended particle (Runs Nos. 2, 4 to 8, 10 to 17 and 19 in Table 1). When the solution containing pale pink-colored suspended particles was microscopically observed, spherical particles, agglomerated masses of the spherical particles and a small amount of a powder were seen to exist in it.

With occasional stirring, the contents of the separable flask were heated to 80° C. over 60 minutes and then maintained at a temperature of 80° to 82° C. for 15 minutes. The reaction product was washed with hot water at 40° to 45° C., treated at 60° C. for 30 minutes in a mixed aqueous solution containing 0.5% by weight of ammonia and 50% by weight of methanol, again washed with warm water at 40° to 45° C., and then dried at 80° C. for 2 hours.

The properties of the reaction products obtained in the above manner by using mixed aqueous solutions of hydrochloric acid and formaldehyde having the various compositions are shown in Table 2.

(2) For comparison, the following experiments were conducted.

(a) A 1-liter separable flask was charged with 282 g of distilled phenol, 369 g of 37% by weight formalin, and 150 g of a 26% by weight aqueous solution of ammonia, and with stirring, the mixture was heated from room temperature to 70° C. over 60 minutes. The mixture was further heated with stirring at 70° to 72° C. for 90 minutes, and then allowed to cool. The cooled mixture was dehydrated by azeotropic distillation under a pressure of 40 mmHg while adding 300 g of methanol in small portions. Methanol (700 g) was added as a solvent, and a yellowish clear solution of a resol resin was withdrawn.

When a part of the resol resin solution was subjected to solvent elimination under reduced pressure, it vigorously foamed and changed to a gel. The gel was heat-cured in a nitrogen gas at 160° C. for 60 minutes. The resulting cured foamed product was pulverized and screened by a 100 Tyler mesh sieve. A small amount of a powder which passed through the sieve was obtained. The heat-cured resol resin was very hard, and even by using various pulverizing machines, a ball mill, and a vibratory mill for fluorescent X-rays, a powder which passed through the 100 Tyler mesh sieve was extremely difficult to obtain. The resulting powder of the heat-cured resol resin was treated with a mixed aqueous solution containing 0.5% by weight of ammonia and 50% by weight of methanol under the same conditions as described above, washed with warm water, and then dried. The properties of the product are shown in Table 2 as Run No. 21.

(b) A 1-liter separable flask was charged with 390 g of phenol, 370 g of 37% by weight formalin, 1.5 g of oxalic acid and 390 g of water. With stirring, the mixture was heated to 90° C. over 60 minutes, and maintained at 90° to 92° C. for 60 minutes with stirring. Then, 1.0 g of 35% by weight hydrochloric acid was added, and the mixture was heated further at 90° to 92° C. for 60 minutes. The product was cooled by adding 500 g of water. Water was removed by a siphon, and the residue was heated under a pressure of 30 mmHg, maintained at 100°

C. for 3 hours, and further at 180° C. under reduced pressure for 3 hours. On cooling, the resultant novolak resin was obtained as a yellowish brown solid which had a softening temperature of 78° to 80° C. and a free phenol content, determined by liquid chromatography, of 0.76% by weight.

The novolak resin was pulverized and mixed with 15% by weight of hexamethylenetetramine. The mixture was heat-cured at 160° C. for 120 minutes in a nitrogen gas, pulverized by a ball mill, and passed through a 100 Tyler mesh sieve. The resultant powder was treated with a mixed aqueous solution containing 0.5% by weight of ammonia and 50% by weight of methanol, washed with warm water and then dried under the same conditions as described above. The properties of the resulting product are shown in Table 2 as Run No. 22.

(c) The novolak resin obtained as above was meltspun at 136° to 138° C. through a spinneret containing 120 orifices having a diameter of 0.25 mm. The spun filaments having an average size of 2.1 denier were dipped for 60 minutes at 20° to 21° C. in a mixed aqueous solution containing 18% by weight of hydrochloric acid and 18% by weight of formaldehyde, heated to 97° C. over 5 hours, and then maintained at 97° to 98° C. for 10 hours. The cured novolak fibers were washed with warm water treated with a mixed aqueous solution containing 0.5% by weight of ammonia and 50% by weight of methanol, washed with water, and then dried under the same conditions as described above. The treated fibers were pulverized by a ball mill, and passed through a 100 Tyler mesh sieve. The properties of the powder which passed through the 100 Tyler mesh sieve are shown in Table 2 as Run No. 23.

(3) Table 1 shows the concentrations of hydrochloric acid and formaldehyde, the total concentration of hydrochloric acid and formaldehyde, and the mole ratio of formaldehyde to phenol in each run.

Table 2 shows the contents of particles having a size of 1 to 50μ, 1 to 100μ, and 1 to 150μ of the resulting samples determined by microscopic observation, the amounts of the samples which passed through a 100 Tyler mesh sieve, the ratio of the IR absorption intensity at 990–1015 cm$^{-1}$ to that at 1600 cm$^{-1}$ and the ratio of IR absorption intensity at 890 cm$^{-1}$ to that at 1600 cm$^{-1}$, and the weight increases by acetylation in each run.

TABLE 1

| Run No. | Concentrations in the aqueous solution (wt. %) | | | Mole ratio of formaldehyde to phenol |
|---|---|---|---|---|
| | HCL | HCHO | Total | |
| 1 | 3 | 1 | 4 | 1.1 |
| 2 | 3 | 25 | 28 | 23.8 |
| 3 | 5 | 5 | 10 | 4.9 |
| 4 | 5 | 10 | 15 | 9.6 |
| 5 | 5 | 22 | 27 | 20.9 |
| 6 | 7 | 30 | 37 | 28.5 |
| 7 | 10 | 6 | 16 | 5.8 |
| 8 | 10 | 20 | 30 | 19.1 |
| 9 | 12 | 3 | 15 | 2.8 |
| 10 | 15 | 5 | 20 | 4.9 |
| 11 | 15 | 25 | 40 | 23.8 |
| 12 | 18 | 10 | 28 | 9.6 |
| 13 | 20 | 7 | 27 | 6.8 |
| 14 | 22 | 4 | 26 | 4.0 |
| 15 | 22 | 17 | 39 | 16.2 |
| 16 | 25 | 6 | 31 | 5.8 |
| 17 | 25 | 25 | 50 | 23.8 |
| 18 | 28 | 3 | 31 | 2.8 |
| 19 | 28 | 7 | 35 | 6.8 |
| 20 | 33 | 1 | 34 | 1.1 |

TABLE 1-continued

| Run No. | Concentrations in the aqueous solution (wt. %) | | | Mole ratio of formaldehyde to phenol |
|---|---|---|---|---|
| | HCL | HCHO | Total | |
| 21 | Heat-cured product of resol resin | | | |
| 22 | Heat-cured product of novolak and hexamine | | | |
| 23 | Cured novolak fibers | | | |

TABLE 2

| Run No. | Content of 1–50μ particles (%) | Content of 1–100μ particles (%) | Content of 1–150μ particles (%) | 100 mesh pass (wt. %) | I.R intensity ratio | | Weight increase by acetylation (wt. %) |
|---|---|---|---|---|---|---|---|
| | | | | | 990–1015 cm$^{-1}$ | 890 cm$^{-1}$ | |
| 1 | 1 (76) | 1 (100) | 1 (100) | 1 (83) | 0.35 | 0.10 | 8.6 |
| 2 | 3 (73) | 3 (100) | 3 (100) | 4 (79) | 0.45 | 0.11 | 19.5 |
| 3 | 13 (87) | 13 (100) | 13 (100) | 8 (75) | 0.42 | 0.11 | 21.7 |
| 4 | 50 | 89 | 96 | 62 | 0.86 | 0.18 | 25.4 |
| 5 | 53 | 97 | 100 | 63 | 4.82 | 0.73 | 27.8 |
| 6 | 12 (76) | 12 (100) | 12 (100) | 18 (84) | 6.68 | 1.02 | 30.6 |
| 7 | 61 | 98 | 100 | 63 | 0.23 | 0.10 | 25.7 |
| 8 | 83 | 100 | 100 | 78 | 2.36 | 0.58 | 33.5 |
| 9 | 61 | 92 | 100 | 61 | 0.21 | 0.14 | 26.3 |
| 10 | 83 | 100 | 100 | 76 | 0.25 | 0.11 | 28.1 |
| 11 | 63 | 81 | 100 | 61 | 4.83 | 0.46 | 30.5 |
| 12 | 99 | 100 | 100 | 98 | 1.52 | 0.40 | 32.8 |
| 13 | 99 | 100 | 100 | 91 | 0.83 | 0.25 | 31.4 |
| 14 | 69 | 94 | 100 | 69 | 0.26 | 0.17 | 24.7 |
| 15 | 54 | 75 | 92 | 71 | 2.16 | 0.64 | 29.9 |
| 16 | 84 | 98 | 100 | 79 | 0.37 | 0.12 | 28.5 |
| 17 | 10 (86) | 10 (94) | 10 (100) | 2 (73) | 4.26 | 0.13 | 41.3 |
| 18 | 50 | 87 | 96 | 62 | 0.27 | 0.10 | 23.8 |
| 19 | 59 | 93 | 100 | 69 | 0.44 | 0.10 | 27.6 |
| 20 | 2 (52) | 2 (95) | 2 (100) | 1 (61) | 0.23 | 0.10 | 19.7 |
| 21 | 17 | — | — | — | 0.12 | 0.09 | 9.9 |
| 22 | 58 | — | — | — | 5.47 | 0.07 | 18.7 |
| 23 | 39 | — | — | — | 0.87 | 0.23 | 22.6 |

In Run Nos. 1, 2, 3, 6, 17 and 20, a sticky resin, or a hard and large lumpy mass or plate-like mass formed in large amounts at the bottom of the separable flask.

In Runs Nos. 1, 2 and 20, less than 49 g of the solid product was obtained from 50 g of phenol.

In Runs 1, 2, 3, 6, 17 and 20, the data given in Table 2 of the contents (%) of particles having a size of 1 to 50μ, 1 to 100μ and 1 to 150μ and the amounts of the samples which passed through the 100 Tyler mesh sieve were obtained with regard to the granular or powdery product based on the total solids including the sticky resin or the lumpy and plate-like masses. The parenthesized figures shown in Table 2 in regard to these data are based only upon the entire granular or powdery product in the total solids formed.

It is seen from the foregoing experimental facts including the results given in Table 2 that the methods used in Runs Nos. 1, 2, 3, 6, 17 and 20 are not recommendable. Nevertheless, the granular or powdery product present in the entire product obtained by each of these methods had the characteristics within the scope of the present invention.

(4) FIG. 1-B of the accompanying drawings shows a microphotograph taken through a scanning electron microscope (magnification 1,000) of the granular or powdery product obtained in Run No. 15.

FIG. 1-A shows a microphotograph taken through an optical microscope (magnification 200) of the granular or powdery product obtained in Run No. 15.

FIG. 5 shows an infrared absorption spectrum of the granular or powdery product obtained in Run No. 12. FIG. 5 also illustrates a method of determining $t_p$ and $t_b$ required for calculating the absorption intensity D in the infrared spectral chart. A base line is drawn tangent to a certain peak, and $t_p$ and $t_b$ at the wavelength of the peak can be determined as illustrated.

EXAMPLE 2

Mixed aqueous solutions containing 20% by weight of hydrochloric acid and 11% by weight of formaldehyde were put respectively in six 20-liter reaction vessels in an amount of 10.2 to 11.7 kg so that the bath ratios shown in Table 3 were obtained.

A mixed solution containing 90% by weight of phenol and 3.7% by weight of formaldehyde was added, with stirring at 23° C., to the reactors in an amount of 1.8 kg, 1.5 kg, 0.9 kg, 0.7 kg, 0.4 kg, and 0.25 kg, respectively. At this time, the bath ratio was 7.3, 8.5, 13.5, 17.0, 28.9, and 45.6, respectively. In all cases, continued stirring after the addition of the mixed aqueous solution resulted in abrupt white turbidity in 40 to 120 seconds. As soon as white suspended particles were formed, the stirring was stopped and the reactor was left to stand. The temperature of the inside of the reactor gradually rose, and the contents gradually turned pale pink. In 30 minutes after the formation of the white suspended particles, the formation of a slurry-like or resinous product was observed in all of the reactors. With stirring, the contents in each of the reactors were heated to 75° C. over 2 hours, and then heated with stirring at 75° to 76° C. for 30 minutes. In the reactor in which the bath ratio was initially 7.3, a large amount of a resinous cured product adhered to the stirring rod and made the stirring very difficult. During the temperature elevation, the contents changed from pale pink to pink, and further turned red in all of the reactors.

The contents were then washed with water, treated at 50° C. for 60 minutes in a mixed aqueous solution containing 0.1% by weight of ammonia and 55% by weight of methanol, and further washed with hot water at 80° C. for 60 minutes. The resulting granular or powdery product or the resulting lumpy product was lightly crumpled with hand, and dried at 100° C. for 2 hours. After drying, all of the products had a water content of less than 0.2% by weight.

Table 3 shows the maximum temperature reached within the reaction system from the initiation of the reaction to 30 minutes after the formation of white suspended particles, the yield of the reaction product, the presence or absence of spherical primary particles by microscopic observation, the content of particles which passed through a 100 Tyler mesh sieve in the reaction product, the heat fusibility of the reaction product at 100° C., the elemental analysis values of the reaction product, the OH value of the reaction product, and the light reflectance (%) at 500 mμ of the acetylated product in each run.

TABLE 3

| Run No. | Bath ratio | Maximum temperature reached in the reaction system (°C.) | Yield (wt. %) | Particles which passed through a 100 Tyler mesh sieve (wt. %) | Bulk density | Presence or absence of spherical primary particles | Fusibility at 100° C. | Elemental analysis (wt. %) C | H | O | N | OH value | Reflectance at 500 mμ (%) |
|---|---|---|---|---|---|---|---|---|---|---|---|---|---|
| 31 | 7.3 | 39.5 | 110 | 29 | 0.25 | Little | Fused | 74.5 | 5.7 | 19.0 | 0.6 | 330 | 75 |
| 32 | 8.5 | 38.5 | 113 | 63 | 0.23 | Much | Infusible | 74.7 | 5.6 | 19.3 | 0.3 | 335 | 82 |
| 33 | 13.5 | 37.0 | 115 | 78 | 0.21 | More than half | " | 75.0 | 5.7 | 20.0 | 0.2 | 360 | 84 |
| 34 | 17.0 | 36.5 | 118 | 91 | 0.20 | More than half | " | 75.1 | 5.7 | 19.1 | 0.1 | 378 | 84 |
| 35 | 28.9 | 35.5 | 118 | 98 | 0.19 | More than half | " | 76.3 | 5.7 | 18.7 | 0.0 | 385 | 85 |
| 36 | 45.6 | 35.0 | 117 | 97 | 0.19 | More than half | " | 75.7 | 5.7 | 18.3 | 0.0 | 377 | 85 |
| 21 (see Table 1) | | | — | — | 0.67 | none | " | 78.7 | 5.7 | 14.7 | 0.7 | 235 | 52 |
| 22 (see Table 1) | | | — | — | 0.50 | " | Fused | 78.1 | 6.0 | 13.7 | 2.3 | — | 69 |
| 23 (see Table 1) | | | — | — | 0.27 | " | Infusible | 74.8 | 5.6 | 19.2 | 0.5 | 325 | 73 |

In Table 3, the OH value of the product of Run No. 22 could not be measured because of great variations.

In Run No. 31, about 70% of the solid product formed at the bottom of the reactor consisted of a plate-like product and a lumpy product, and only about 30% of the entire solid was a granular or powdery product. About 95% of the entire granular or powdery product passed through a 100 Tyler mesh sieve.

The presence or absence of spherical primary particles in Run 31 is indicated as "little" in Table 3. This is because the proportion of the granular or powdery solid product in the entire solid was as low as about 30%. Hence, the method of Run No. 31 is not recommendable, but the resulting granular or solid product is within the scope of the granular or powdery resin of the invention.

The granular or powdery products formed in Runs Nos. 31 to 36 were composed almost entirely of particles having a particle diameter of 1 to 100μ.

FIGS. 2-A and 2-B respectively show an optical microphotograph, and a scanning electron microphotograph, of the product formed in Run No. 35.

EXAMPLE 3

One thousand grams of mixed aqueous solutions containing 20% by weight of hydrochloric acid and 8% by weight of formaldehyde and heated respectively to 30°, 60°, 80° and 98° C. were prepared respectively in four 2-liter separable flasks. Then, 50 g of a mixed aqueous solution containing 70% by weight of phenol and 6% by weight of formaldehyde was added dropwise to each of the HCl-formaldehyde aqueous solutions over 30 seconds through a dropping funnel fitted to each separable flask. When the temperature of the HCl-formaldehyde solution was 60°, 80° and 98° C. respectively, white suspended particles formed as soon as the phenol-formaldehyde solution was added dropwise, and turned pink to red within a short period of time. In particular, when the temperature of the HCl-formaldehyde bath was 98° C., the reaction proceeded within a very short period of time and a large amount of a secondary, relatively strongly agglomerated mass of granules or a powder was seen to form.

In the case of using the HCl-formaldehyde bath heated at 30° C., the mixture after the addition of the mixed aqueous solution of phenol and formaldehyde was left to stand for 0.5 hour (Run No. 41), 1 hour (Run No. 42), 3 hours (Run No. 43), 6 hours (Run No. 44), 24 hours (Run No. 45), and 72 hours (Run No. 46).

Furthermore, in the case of using the aqueous solutions of HCl and formaldehyde at a temperature of 60°, 80° and 98° C., the mixture after the addition of the mixed aqueous solution of phenol and formaldehyde was left to stand for 15 minutes (Runs Nos. 47, 48, and 49, respectively).

The product obtained in Run No. 42, while the mixed aqueous solution of HCl and formaldehyde was still adhering to it, was put in an HCl-formaldehyde aqueous solution having the same composition as above and heated at 60°, 80° and 98° C. respectively and left to stand for 15 minutes at the respective temperatures (Runs Nos. 50, 51 and 52, respectively).

While stirring, the product obtained in Run No. 42 was put into each of a mixed aqueous solution at 80° C. containing 15% by weight of hydrochloric acid and 10% by weight of formaldehyde, a mixed aqueous solution at 80° C. containing 15% by weight of hydrochloric acid and 5% by weight of formaldehyde, and a mixed aqueous solution at 80° C. containing 10% by weight of hydrochloric acid and 5% by weight of formaldehyde, and maintained at 80° C. for 15 minutes with stirring (Runs Nos. 53, 54 and 55, respectively, in this order).

In all of Runs Nos. 53, 54 and 55, water was added to the reaction mixture after the above-mentioned reaction, and the cooled contents were withdrawn, washed with water, subjected to a neutralization treatment, washed with water, and then dried at 70° C. for 3 hours. The neutralization treatment was carried out in a 10% by weight aqueous solution of ammonia at 50° C. for 60 minutes.

Table 4 shows the amount of particles which passed through a 100 Tyler mesh sieve, the heat fusibility at 100° C., $D_{990-1015}/D_{1600}$ and $D_{890}/D_{1600}$, and the free phenol content of each of the products obtained in the above runs.

FIGS. 3-A and 3-B respectively show an optical microphotograph, and a scanning electron microphotograph, of the product obtained in Run No. 43.

TABLE 4

| Run No. | Amount of particles which passed through a 100 Tyler mesh sieve (wt. %) | Heat fusibility at 100° C. | IR intensity ratio 990–1015 $cm^{-1}$ | IR intensity ratio 890 $cm^{-1}$ | Free phenol content (ppm) |
|---|---|---|---|---|---|
| 41 | 54 | Fused | 0.56 | 0.10 | 26 |
| 42 | 87 | " | 0.97 | 0.13 | 19 |
| 43 | 96 | " | 1.10 | 0.12 | 16 |
| 44 | 97 | " | 1.27 | 0.14 | 7 |
| 45 | 98 | " | 1.23 | 0.23 | less than 2 |
| 46 | 97 | " | 1.40 | 0.18 | less than 2 |
| 47 | 78 | " | 1.28 | 0.20 | less than 2 |
| 48 | 74 | Infusible | 1.56 | 0.42 | less than 2 |
| 49 | 10 | " | 0.66 | 0.13 | less than 2 |
| 50 | 92 | Fused | 1.46 | 0.21 | less than 2 |
| 51 | 99 | Infusible | 2.32 | 0.44 | less than 2 |
| 52 | 75 | " | 0.91 | 0.18 | less than 2 |
| 53 | 98 | " | 1.95 | 0.40 | less than 2 |
| 54 | 99 | " | 1.44 | 0.38 | less than 2 |
| 55 | 94 | " | 0.73 | 0.19 | less than 2 |

EXAMPLE 4

Five hundred grams of a mixed aqueous solution at 18° C. containing 18% by weight of hydrochloric acid and 11% by weight of formaldehyde was put into each of nine 1-liter separable flasks. With stirring, 20 g of phenol or a dilution of 20 g of phenol in a predetermined amount of formalin or water was put at one time into each separable flask. In each run, the stirring was stopped when the formation of white suspended particles was observed, and the mixture was left to stand. In 2 hours from the addition, the mixture was heated to 85° C. over 60 minutes, and then maintained at 85° C. for 30 minutes.

Then, the product obtained in each run was washed with water, treated with a 0.5% by weight aqueous solution of ammonia at 70° C. for 30 minutes, subsequently washed with hot water at 80° C. for 60 minutes, dehydrated and further dried at 80° C. for 3 hours. These experiments are shown as Runs Nos. 56 to 64.

Table 5 shows the concentration of formalin used, the composition of the mixed solution of phenol diluted with formalin, the time which elapsed from the addition of phenol to the formation of the white suspended particles, the time which elapsed until the white suspended particles turned pink, and the proportion of particles which passed through a 100 Tyler meash sieve in each run.

TABLE 5

| Run No. | Concentration of formalin used | Diluted solution (wt. %) Phenol | Diluted solution (wt. %) Formaldehyde | Time elapsed until the beginning of the formation of white suspended particles (seconds) | Time elapsed until the color of the particles changed to pink (minutes) | Amount of particles which passed through a 100 Tyler mesh sieve (wt. %) |
|---|---|---|---|---|---|---|
| 56 | Not used | 100 | 0 | 57 | 7 | 78.1 |
| 57 | 37% | 94 | 2.2 | 74 | 8 | 83.3 |
| 58 | 37% | 90 | 3.7 | 98 | 8 | 92.9 |
| 59 | 37% | 80 | 7.4 | 105 | 9 | 97.4 |
| 60 | 0 | 90 | (water 10) | 102 | 9 | 83.2 |
| 61 | 10% | 85 | 1.5 | 96 | 9.0 | 87.7 |
| 62 | 30% | " | 4.5 | 86 | 8.0 | 98.5 |
| 63 | 40% | " | 6.0 | 80 | 7.5 | 97.6 |
| 64 | 44% | " | 6.6 | 76 | 7.5 | 74.4 |

In Run 56, phenol was dissolved by heating to 50° C. before it was used.

In Runs Nos. 57 and 64, the diluted mixed solution was used after it was heated to 45° C. in order to avoid coagulation or precipitation of phenol or formaldehyde.

FIGS. 4-A and 4-B respectively show an optical microphotograph, and a scanning electron microphotograph, of the product obtained in Run No. 59.

EXAMPLE 5

Five hundred grams of a mixed aqueous solution at 22° C. containing 18% by weight of hydrochloric acid, 10% by weight of formaldehyde and 5% by weight of zinc chloride was put into each of three 1-liter separable flasks. With stirring, 25 g of a mixed aqueous solution containing 90% by weight of each of the phenols described in Table 5 and 10% of 37% formalin was added at room temperature. In 30 seconds after the addition, the stirring was stopped. In 10 minutes after the addition, the mixture was heated to 85° C. over 30 minutes, and maintained at 85° to 86° C. for 30 minutes. Then, 500 cc of cold water was added, and the contents of each flask were taken out, washed with water, treated with a mixed aqueous solution containing 3% by weight of ammonia and 40% by weight of methanol at 50° C. for 30 minutes, then washed with water and dried.

Table 6 summarizes the proportion of the phenol used, the time which elapsed until the formation of white suspended particles after the addition of the phenol, the proportion of particles which passed through a 100 Tyler mesh sieve, and the solubility of the product in methanol in each run.

TABLE 6

| Run No. | Proportions of phenols used (weight %) Phenol | Proportions of phenols used (weight %) m-Cresol | Proportions of phenols used (weight %) p-Cresol | Time elapsed until the formation of white suspended particles (seconds) | Proportion of particles which passed the 100 mesh sieve (weight %) | Solubility in methanol (weight %) |
|---|---|---|---|---|---|---|
| 65 | 100 | 0 | 0 | 47 | 96.5 | 0 |
| 66 | 85 | 15 | 0 | 64 | 92.4 | 0 |
| 67 | 85 | 0 | 15 | 450 | 63.5 | 0.8 |

EXAMPLE 6

A 1000-liter reactor equipped with a stirring rod was charged with 800 kg of a mixed aqueous solution at 27° C. containing 18.5% by weight of hydrochloric acid and 8.5% by weight of formaldehyde. While the mixed aqueous solution was being stirred, 36.4 kg of an 88% by weight aqueous solution of phenol at 20° C. was added. After adding all of the aqueous phenol solution, the mixture was stirred for 40 seconds. The stirring was stopped, and the mixture was allowed to stand for 1 hour. In 60 seconds after the addition of all the aqueous phenol solution, white suspended particles formed abruptly in the reactor and gradually changed to pale pink-colored particles. At the same time, the temperature of the inside of the reactor increased gradually to 39.5° C. and then decreased.

Thereafter, while the mixed aqueous solution containing the reaction product was again stirred, its temperature was raised to 70° C. over 40 minutes. The mixture was then maintained at 70° C. for 10 minutes and allowed to cool to room temperature. A valve fitted to the bottom of the reactor was opened to withdraw the contents which were then separated by means of a nonwoven fabric of Nomex (trademark) into the reaction product and the mixed aqueous solution containing hydrochloric acid and formaldehyde. The reaction product was washed with water, dehydrated, then treated for 2 hours in a 0.5% by weight aqueous solution of ammonia at 40° C., again washed with water, dehydrated, and dried to give 40.1 kg of the final product (Run No. 68).

Table 7 summarizes the contents of particles having a size of 0.1 to 50μ and particles having a size of 0.1 to 100μ determined by microscopic observation of the resulting dry sample, the amount of particles which passed through a 100 Tyler mesh sieve, the ratio of the intensity of an absorption at 990–1015 cm$^{-1}$ to that at 1600 cm$^{-1}$ and the ratio of the intensity of an absorption at 890 cm$^{-1}$ to that at 1600 cm$^{-1}$ determined by infrared absorption spectroscopy, and the solubility of the sample in methanol.

TABLE 7

| Run No. | Content of 0.1–50μ particles (%) | Content of 0.1–100μ particles (%) | Amount of particles passed through the 100 mesh sieve (wt. %) | IR intensity ratio 990–1015 cm$^{-1}$ | 890 cm$^{-1}$ | Solubility in methanol (wt. %) |
|---|---|---|---|---|---|---|
| 68 | 92 | 100 | 97 | 1.32 | 0.26 | 0.5 |

Referential Example 1

Thirty grams of the product (as a filler) obtained in Run No. 35 in Example 2 was mixed with 30 g (as solids) of the resol resin (uncured) used in Run No. 21 of Example 1. The resin mixture was dried at room temperature for a day and night, and then dried in an oven at 80° C. for 30 minutes. A predetermined amount of the dried product was treated under a pressure of 50 kg/cm² for 30 minutes in a mold heated at 150° C. to form five test samples having a thickness of 3.5 mm and being in the form of a square each side measuring 10 mm.

As controls, five samples were prepared from the products obtained in Runs Nos. 21, 22 and 23 in Example 1 (as fillers) and the resol resin (uncured) used in Run No. 21 of Example 1 under the same conditions and by the same method as above.

In each run, the moldability of the resin composition and the compression strength, compression set and stickiness (compression strength multiplied by compression set) of the molded product (as an average of the five samples) by a compression tester were determined, and the results are shown in Table 8. The size of each test sample was precisely measured before the compression test by using a caliper gage.

TABLE 8

| Run No. | Filler | Moldability (flow of the resin composition) | Compression strength (kg/cm²) | Compression set (%) | Stickiness (kg/cm² × %) |
|---|---|---|---|---|---|
| 80 | Product of Run No. 35 | Very good | 2710 | 33.5 | 9.1 × 10⁴ |
| 81 | Product of Run No. 21 | Poor | 2070 | 19.2 | 4.0 × 10⁴ |
| 82 | Product of Run No. 22 | Good (much gas generation) | 1460 | 35.5 | 5.2 × 10⁴ |
| 83 | Product of Run No. 23 | Good | 2490 | 23.2 | 5.8 × 10⁴ |

When the same uncured resol resin as described above was used alone in an attempt to form a molded article as above, the resin flowed out from the mold or was foamed when heated at 150° C., and a molded article could not be obtained.

Referential Example 2

The uncured resol resin used in Run No. 21 of Example 1 was mixed with each of the products obtained in Runs Nos. 35, 21, 22 and 23. Each of the mixtures obtained was molded into articles having a width of 20 mm, a thickness of 3.5 mm and a length of 120 mm (having a filler content of 55% by weight) (five samples for each resin mixture).

The molded articles were heat-treated at 100° C. for 2 hours in a stream of nitrogen gas, and then precisely weighed to provide precursors for subsequent firing.

Each of the precursors obtained as above was heated in a stream of nitrogen gas from room temperature to 1000° C. at a rate of 30° C./hour, maintained at 1000° C. for 60 minutes, and then gradually cooled to form carbonized articles.

Table 9 summarizes the moldability of each resin mixture the yield of the carbonized article based on the precursor, and the flexuaral strength and appearance of the carbonized product.

TABLE 9

| Run No. | Filler | Moldability (flow of the resin mixture) | Yield (%) | Flexural strength (kg/cm²) | Appearance |
|---|---|---|---|---|---|
| 84 | Product of Run No. 35 | Very good | 67.1 | 1070 | Good |
| 85 | Product of Run No. 21 | Poor | 61.4 | 100> | Cracks formed |
| 86 | Product of Run No. 22 | Good (much gas generation) | 58.6 | 100> | Cracks and gas blisters |
| 87 | Product of Run No. 23 | Good | 67.6 | 1030 | Good |

The flexural strength was measured in accordance with JIS K-6911.

Referential Example 3

One hundred parts by weight of chlorinated rubber composed of chlorinated polyethylene as a main component (a product obtained by adding a peroxide vulcanization agent to ELASLEN NF-01; manufactured by Showa Denko Kabushiki Kaisha) was mixed in the molten state with 30 parts by weight of the product obtained in Run No. 13 of Example 1 on an open roll at 85° C. to form a rubber sheet having a thickness of 1.2 mm. The sheet was treated for 30 minutes under a pressure of 10 kg/cm² by means of a hot press heated at 150° C. The thickness of the rubber sheet decreased to about 1.1 mm.

As a control, a vulcanized sheet having a thickness of about 1.0 and composed only of the same chlorinated rubber as above was prepared by the same procedure as above.

Table 10 summarizes the moldability, hardness, tensile strength and elongation of the two sheets obtained as above, and the hardness, tensile strength and elongation of these sheets after they were heat-treated in the air at 170° C. for 6 hours.

TABLE 10

| Run No. | Composition of the rubber sheet | Properties of the rubber sheet | | | | Properties of the heat-treated rubber sheet | | |
|---|---|---|---|---|---|---|---|---|
| | | Moldability | Hardness (degree) | Strength (kg/cm$^2$) | Elongation (%) | Hardness (degree) | Strength (kg/cm$^2$) | Elongation (%) |
| 88 | Chlorinated rubber alone | Poor flowability (blisters) | 72 | 51 | 370 | 77 | 54 | 140 |
| 89 | Chlorinated rubber/the product of Run No. 13 (=100/30) | Good flowability | 86 | 53 | 105 | 91 | 68 | 56 |

The hardness, strength and elongation were measured in accordance with the methods of JIS K-6301.

Referential Example 4

Sixty parts by weight of asbestos and 40 parts by weight of the product of Run No. 45 of Example 3 were dispersed in water with stirring. The resulting slurry having a solids concentration of 0.30% by weight was subjected to a sheet-forming process by means of a P.S.S. type sheet machine (manufactured by Toyo Seiki Co., Ltd.) and then hot-pressed at a temperature of 140° C. under a pressure of 5 kg/cm$^2$ for 3 minutes to product a sheet having a basis weight of 121 g/m$^2$ and a thickness of 0.3 mm. The yield of the resulting sheet calculated from the amounts of the raw materials used and the sheet was 99%.

The spent liquor after the sheet formation was filtered by a glass filter. The phenol content of the spent liquor, measured by the 4-aminoantipyrine method, was less than 0.01 ppm.

Table 11 summarizes the tensile strength of the sheet, its combustibility determined by application of a match flame, and its tensile strength measured after the sheet was treated in the air at 200° C. for 24 hours.

TABLE 11

| Run No. | Tensile strength of the sheet (kg/15 mm) | Combustibility | Tensile strength of the sheet after heat-treatment at 200° C. × 24 hrs. (kg/15 mm) |
|---|---|---|---|
| 90 | 3.6 | No burning | 4.2 |

What we claim is:

1. A granular or powdery resin which is a condensation product of a phenol and formaldehyde, said granular or powdery resin being characterized by (A) containing spherical primary particles and secondary particles resulting from the agglomeration of the primary particles, each of the particles having a particle diameter of 0.1 to 150 microns, (B) having such a size that at least 50% by weight thereof can pass through a 100 Tyler mesh sieve, (C) having a free phenol content, determined by liquid chromatography, of not more than 50 ppm, (D) having a $D_{990-1015}/D_{1600}$ ratio of from 0.2 to 9.0 and a $D_{890}/D_{1600}$ ratio of from 0.09 to 1.0 in its infrared absorption spectrum measured by a KBr tablet method, wherein $D_{1600}$ represents the absorption intensity of an absorption peak at 1600 cm$^{-1}$ assigned to benzene, $D_{990-1015}$ represents the highest absorption intensity of absorption peaks at 990 to 1015 cm$^{-1}$ assigned to the methylol groups, and the $D_{890}$ represents the absorption intensity of an absorption peak at 890 cm$^{-1}$ assigned to a lone hydrogen atom of the benzene ring, and (E) having a weight increase by acetylation, I defined by the following equation, of 23 to 40% by weight, $$I = (W_1 - W_o)/W_o \times 100 \ (\%)$$

wherein $W_o$ is the weight in grams of said resin before acetylation, and $W_1$ is the weight in grams of the resin after acetylation, said acetylation being carried out by gradually heating 10 g of said resin from room temperature to 115° C. over the course of 45 minutes in 300 g of an acetylation bath consisting of 78% by weight of acetic anhydride, 20% by weight of acetic acid and 2% by weight of orthophosphoric acid and maintaining it at 115° C. for 15 minutes.

2. The resin of claim 1 wherein at least 30% of the granular or powdery resin consists of spherical primary particles and the secondary agglomerated particles thereof, each of the particles having a particle diameter of 0.1 to 150 microns.

3. The resin of claim 1 wherein at least 50% of the granular or powdery resin consists of spherical primary particles and the secondary agglomerated particles thereof, each having a particle diameter of 0.1 to 150 microns.

4. The resin of claim 1 wherein 70 to 100% of the granular or powdery resin consists of spherical primary particles and the secondary agglomerated particles thereof, each having a particle diameter of 0.1 to 150 microns.

5. The resin of claim 1 which has such a size that at least 70% by weight thereof can pass through a 100 Tyler mesh sieve.

6. The resin of any one of claims 1 to 4 which has such a size that at least 80% by weight thereof can pass through a 100 Tyler mesh sieve.

7. The resin of claim 1 which has a free phenol content, determined by liquid chromatography, of not more than 40 ppm.

8. The resin of any one of claims 1 to 6 which has a free phenol content, determined by liquid chromatography, of not more than 20 ppm.

9. The resin of claim 1 which as a $D_{990-1015}/D_{1600}$ ratio of from 0.3 to 7.0.

10. The resin of any one of claims 1 to 8 which has a $D_{990-1015}/D_{1600}$ ratio of from 0.4 to 5.0.

11. The resin of claim 1 which has a $D_{890-1600}$ ratio of from 0.1 to 0.9.

12. The resin of any one of claims 1 to 10 which has a $D_{890}/D_{1600}$ ratio of from 0.12 to 0.8.

13. The resin of claim 1 which has a weight increase by acetylation of from 25 to 37% by weight.

14. The resin of any one of claims 1 to 12 which has a weight increase by acetylation of from 27 to 35% by weight.

15. The resin of any one of claims 1 to 14 which does not substantially contain a nitrogen-containing basic organic compound.

16. The resin of any one of claims 1 to 14 which does not substantially contain a hydrophilic polymeric compound.

17. The resin of claim 1 which consists substantially of carbon, hydrogen and oxygen as a result of elemental analysis and has the following composition:
C: 70 to 80% by weight,
H: 5 to 7% by weight, and
O: 17 to 21% by weight (100% by weight in total).

18. The resin of claim 17 which has a solubility in methanol, as defined in the body of the specification, of not more than 20%.

19. The resin of any one of claims 1 to 18 which, when acetylated by the method described for the measurement of the weight increase by acetylation, has a light reflectance (whiteness) at a wavelength of 500 m$\mu$, measured by the reflection spectral method defined in the body of the specification, of at least 75%.

20. The resin of claim 1 which when maintained at 100° C. for 5 minutes in accordance with the method for measuring heat fusibility described in the body of the specification, is at least partly fused.

21. The resin of claim 1 which, when maintained at a temperature of 100° C. for 5 minutes in accordance with the method for measuring heat fusibility described in the body of the specification, is not substantially melted nor fused.

22. A process for producing a granular or powdery phenol-formaldehyde resin which comprises contacting a phenol with a hydrochloric acid-formaldehyde bath containing 5 to 28% by weight of hydrochloric acid and 3 to 25% by weight of formaldehyde with the total concentration of hydrochloric acid and formaldehyde being 15 to 40% by weight, while maintaining a bath ratio, defined by the quotient of the weight of the hydrochloric acid-formaldehyde bath divided by the weight of the phenol, of at least 8, said contacting being effected such that after contacting of the phenol with the bath, white suspended particles are formed and thereafter developed into a pink-colored granular or powdery solid.

23. The process of claim 22 wherein the concentration of hydrochloric acid in the hydrochloric acid-formaldehyde bath is 10 to 25% by weight.

24. The process of claim 22 wherein the concentration of hydrochloric acid in the hydrochloric acid-formaldehyde bath is 15 to 22% by weight.

25. The process of claim 22 wherein the concentration of formaldehyde in the hydrochloric acid-formaldehyde bath is 5 to 20% by weight.

26. The process of any one of claims 22 to 24 wherein the concentration of formaldehyde in the hydrochloric acid-formaldehyde bath is 7 to 15% by weight.

27. The process of any one of claims 22 to 26 wherein the total concentration of hydrochloric acid and formaldehyde in the hydrochloric acid-formaldehyde bath is 20 to 35% by weight.

28. The process of any one of claims 22 to 26 wherein the total concentration of hydrochloric acid and formaldehyde in the hydrochloric acid-formaldehyde bath is 25 to 32% by weight.

29. The process of claim 22 wherein the bath ratio is maintained at 10 or higher.

30. The process of any one of claims 22 to 28 wherein the bath ratio is maintained at 15 to 40.

31. The process of claim 22 wherein the contacting of the hydrochloric acid-formaldehyde bath with the phenol is effected such that first a clear solution is formed by adding the phenol to the hydrochloric acid-formaldehyde bath, and then white suspended particles are formed and thereafter developed into a pink-colored granular or powdery solid.

32. The process of claim 22 or 31 wherein before the white suspended particles are formed after the addition of the phenol to the hydrochloric acid-formaldehyde bath, the bath is stirred to form a uniform clear solution.

33. The process of claim 32 wherein from the time of formation of the white suspended particles subsequent to the addition of the phenol to the hydrochloric acid-formaldehyde bath until the white suspended particles are developed into a pink-colored solid, the bath is not subjected to a mechanical shear force.

34. The process of claim 22 wherein the temperature of the hydrochloric acid-formaldehyde bath is maintained at not more than 90° C., and the phenol is added to said bath.

35. The process of any one of claims 22 to 33 wherein the temperature of the hydrochloric acid-formaldehyde bath is maintained at not more than 70° C., and the phenol is added to said bath.

36. The process of any one of claims 22 to 35 wherein the phenol is diluted with an aqueous solution containing 3 to 44% by weight of formaldehyde, and the diluted solution of the phenol is added to the hydrochloric acid-formaldehyde bath while exercising such a control that upon the addition of the phenol, the composition of the bath is as defined in any one of claims 22 to 24.

37. The process of claim 36 wherein the phenol is diluted with a formalin solution having a formaldehyde concentration of 20 to 40% by weight.

38. The process of claim 36 or 37 wherein the concentration of the phenol in the diluted solution of the phenol is 50 to 95% by weight.

39. The process of claims 36 or 37 wherein the concentration of the phenol in the diluted solution of the phenol is 70 to 90% by weight.

40. The process of claim 22 wherein the temperature of the hydrochloric acid-formaldehyde bath is maintained at not more than 40° C., and the phenol either as such or diluted with an aqueous solution of formaldehyde is added to the bath to form a clear solution, and then white suspended particles are formed in the clear solution and thereafter the bath is heated to a temperature of 70° C. or higher at least before the completion of the reaction.

41. The process of claim 40 wherein the temperature of the hydrochloric acid-formaldehyde bath is maintained at 15° to 35° C., and the phenol or its diluted solution is added to the bath.

42. The process of claim 40 or 41 wherein the temperature of the hydrochloric acid-formaldehyde bath is maintained at not more than 40° C., and substantially all of the phenol or its diluted solution to be added is added to the bath to form a clear solution with or without stirring, and white suspended particles are formed in it in the absence of stirring.

43. The process of claim 22 wherein the temperature of the hydrochloric acid-formaldehyde bath is maintained at not more than 40° C., preferably 15° to 35° C., and substatially all of the phenol either as such or diluted with an aqueous solution of formaldehyde is added to the bath with stirring to form a clear solution, and thereafter white suspended particles are formed in the absence of stirring and then developed into a pale pink-colored granular or powdery solid with or without temperature elevation, followed by maintaining the solid at a temperature of not more than 50° C.

44. The process of claim 22 wherein the temperature of the hydrochloric acid-formaldehyde bath is maintained at not more than 40° C. and substantially all of the phenol as such or diluted with an aqueous solution of formaldehyde is added to the bath with stirring to form a clear solution, and thereafter white suspended particles are formed in the absence of stirring and then developed into a pale pink-colored granular or powdery solid with or without temperature elevation, followed by heating the solid at a temperature higher than 50° C., preferably 70° to 95° C.

45. The process of claim 22 wherein the temperature of the hydrochloric acid-formaldehyde bath is maintained at 35° C. or higher but not higher than 95° C., and the phenol either as such or diluted with an aqueous solution of formaldehyde is added gradually in the form of fine streams of liquid droplets to the bath, and white suspended particles are formed continuously within several minutes after the contacting of the fine streams or liquid droplets with the bath or as soon as the contacting is effected, and then if the initial temperature of the bath is not more than 60° C., it is heated to 70° to 95° C.

46. The process of claim 45 wherein the hydrochloric acid-formaldehyde bath is maintained at a temperature in the range of 60° to 95° C., the phenol or its diluted solution is added dropwise to the bath, and white suspended articles are formed and then developed into a pink-colored granular or powdery solid.

47. The process of claim 22 wherein the phenol is phenol, m-cresol, resorcinol or hydroquinone or a mixture of these.

48. The process of any one of claims 22 to 46 wherein the phenol is phenol.

49. The process of any one of claims 22 to 46 wherein the phenol is a mixture of at least 80% by weight of phenol with at least one substituted phenol selected from the group consisting of o-cresol, m-cresol, p-cresol, bisphenol A, O-, m- and p-($C_2$–$C_4$ alkyl)phenols, p-phenylphenol, xylenol, and resorcinol.

50. The process of claim 22 wherein the granular or powdery solid phenol-formaldehyde resin product is separated from the hydrochloric acid-formaldehyde bath, washed with water, treated with an aqueous solution of an alkali to neutralize the adhering hydrochloric acid, and washed with water.

51. The process of claim 50 wherein the aqueous solution of an alkali is an aqueous solution of ammonia.

52. The process of claim 50 wherein the aqueous solution of an alkali is a methanolic aqueous solution of ammonia.

53. The process of claim 50 wherein the aqueous solution of an alkali is an aqueous solution of an alkali metal hydroxide.

54. The process of claim 51, 52 or 53 wherein the concentration or ammonia or the alkali metal hydroxide is 0.1 to 5% by weight, preferably 0.5 to 3% by weight.

55. The process of claim 52 wherein the concentration of methanol is 20 to 80% by weight, preferably 35 to 60% by weight.

56. The process of claim 50 wherein the neutralization with the aqueous solution of an alkali is carried out at a temperature of 20° to 90° C., preferably 40° to 70° C.

* * * * *

UNITED STATES PATENT AND TRADEMARK OFFICE
CERTIFICATE OF CORRECTION

PATENT NO. : 4,414,378
DATED : November 8, 1983
INVENTOR(S) : Hiroaki Koyama and Shigeo Shimizu It is certified that error appears in the above—identified patent and that said Letters Patent is hereby corrected as shown below:

Claim 1, line 28 change the formula from "$I=(W_1-W_0)/W_0 \times 100$ (%)" to $$--I= \frac{W_1 - W_0}{W_0} \times 100 \text{ (\%)}--$$

Signed and Sealed this

Twenty-fourth Day of April 1984

[SEAL]

Attest:

*Attesting Officer*

GERALD J. MOSSINGHOFF
*Commissioner of Patents and Trademarks*

UNITED STATES PATENT AND TRADEMARK OFFICE
CERTIFICATE OF CORRECTION

PATENT NO. : 4,414,378
DATED : November 8, 1983
INVENTOR(S) : HIROAKI KOYAMA, ET AL.

It is certified that error appears in the above—identified patent and that said Letters Patent is hereby corrected as shown below:

Add the following Assignee: --- Kanebo Ltd., Tokyo, Japan ---;

In Claim 8, line 64 of Column 28, change "1 to 6" to --1 to 4 -

In Claim 10, line 1 of Column 29, change "1 to 8" to -- 1 to 4--

In Claim 11, line 3 of Column 29, change "D890-1600" to -- $D_{890}/D_{1600}$ --;

In Claim 12, line 5 of Column 29, change "1 to 10" to -- 1 to 4

In Claim 14, line 9 of Column 29, change "1 to 12" to -- 1 to 4

In Claim 15, line 12 of Column 29, change "1 to 14" to -- 1 to 4 --;

In Claim 16, line 15 of Column 29, change "1 to 14" to -- 1 to 4 --;

In Claim 19, line 27 of Column 29, change "1 to 18" to -- 1 to 4 --;

In Claim 27, line 1 of Column 30, change "22 to 26" to -- 22 to 24 --;

In Claim 28, line 5 of Column 30, change "22 to 26" to -- 22 to 24 --;

In Claim 30, line 11 of Column 30, change "22 to 28" to -- 22 to 24 --;

In Claim 35, line 34 of Column 30, change "22 to 33" to -- 22 to 24 --;

In Claim 36, line 38 of Column 30, change "22 to 35" to -- 22 to 24 --;

UNITED STATES PATENT AND TRADEMARK OFFICE
CERTIFICATE OF CORRECTION

PATENT NO. : 4,414,378
DATED : November 8, 1983
INVENTOR(S) : HIROAKI KOYAMA, ET AL.

It is certified that error appears in the above—identified patent and that said Letters Patent is hereby corrected as shown below:

In Claim 38, line 49 of Column 30, delete "or 37"

In Claim 39, line 52 of Column 30, delete "or 37"

In Claim 45, line 36 of Column 31, change "of fine streams of liquid droplets" to -- of fine streams or liquid droplets --

In Claim 48, line 10 of Column 32, change "22 to 46" to -- 22 to 24 --;

In Claim 49, line 12 of Column 32, change "22 to 46" to -- 22 to 24 --

Signed and Sealed this

First Day of April 1986

[SEAL]

Attest:

DONALD J. QUIGG

Attesting Officer

Commissioner of Patents and Trademarks